United States Patent
Ishihara

(10) Patent No.: US 9,863,292 B2
(45) Date of Patent: Jan. 9, 2018

(54) STRUCTURE OF AIR FLOW CONTROL VALVE AND INTAKE DEVICE

(71) Applicant: AISIN SEIKI KABUSHIKI KAISHA, Kariya-shi (JP)

(72) Inventor: Hiromitsu Ishihara, Okazaki (JP)

(73) Assignee: AISIN SEIKI KABUSHIKI KAISHA, Kariya-Shi, Aichi-Ken (JP)

( * ) Notice: Subject to any disclaimer, the term of this patent is extended or adjusted under 35 U.S.C. 154(b) by 254 days.

(21) Appl. No.: 14/604,124

(22) Filed: Jan. 23, 2015

(65) Prior Publication Data
US 2015/0211393 A1    Jul. 30, 2015

(30) Foreign Application Priority Data

Jan. 27, 2014 (JP) .................................. 2014-012414

(51) Int. Cl.
*F02D 9/10* (2006.01)
*F02M 35/10* (2006.01)
(Continued)

(52) U.S. Cl.
CPC ............... *F01L 3/20* (2013.01); *F02B 31/06* (2013.01); *F02D 9/16* (2013.01); *F02B 2275/48* (2013.01); *Y02T 10/125* (2013.01); *Y02T 10/146* (2013.01)

(58) Field of Classification Search
CPC ............ F02M 35/104; F02M 35/10255; F02D 9/1005; F02D 41/0002; F02D 9/1075;
(Continued)

(56) References Cited

U.S. PATENT DOCUMENTS

| | | | | |
|---|---|---|---|---|
| 6,979,130 | B1 * | 12/2005 | Stangier | F02B 27/02 123/184.53 |
| 2010/0294227 | A1 * | 11/2010 | Magnan | F02B 31/085 123/184.55 |
| 2013/0160736 | A1 * | 6/2013 | Matsuzaki | F02D 9/1075 123/337 |

FOREIGN PATENT DOCUMENTS

| DE | 10 2005 029 798 A1 | 1/2007 |
|---|---|---|
| EP | 1388652 A2 | 2/2004 |

(Continued)

OTHER PUBLICATIONS

Office Action (Notification of Reasons for Refusal) dated Aug. 22, 2017, by the Japanese Patent Office in corresponding Japanese Patent Application No. 2013-179371, and an English translation of the Office Action. (9 pgs).

*Primary Examiner* — Syed O Hasan
(74) *Attorney, Agent, or Firm* — Buchanan Ingersoll & Rooney PC

(57) ABSTRACT

A structure of an air flow control valve includes: valve main body portions respectively provided in intake ports, and controlling the flow of a fluid supplied to combustion chambers of an internal combustion engine; connecting shafts provided integrally with the valve main body portions, and connecting the valve main body portions; a first bearing member formed of a single member having a first bearing hole turnably supporting the connecting shaft at a first end; and a second bearing member provided separately from the first bearing member, and formed of a single member having a second bearing hole turnably supporting the connecting shaft at a second end. The connecting shafts are formed integrally with the valve main body portions in a state where the first and second bearing members are respectively fitted onto the connecting shafts connecting the valve main body portions.

12 Claims, 9 Drawing Sheets

(VICINITY OF CYLINDER HEAD 203)

(51) Int. Cl.
*F01L 3/20* (2006.01)
*F02D 9/16* (2006.01)
*F02B 31/06* (2006.01)

(58) Field of Classification Search
CPC .... F02D 9/16; F01L 3/20; F02B 31/06; F02B 2275/48
USPC .......... 123/184.56, 184.53, 184.38, 337, 336
See application file for complete search history.

(56) References Cited

FOREIGN PATENT DOCUMENTS

| | | |
|---|---|---|
| JP | H08-277717 A | 10/1996 |
| JP | 2004-285893 A | 10/2004 |
| JP | 2012-136995 A | 7/2012 |
| JP | 2013-256879 A | 12/2013 |

\* cited by examiner (AIR FLOW CONTROL VALVE: OPEN POSTURE)

(AIR FLOW CONTROL VALVE: RESTRICTING POSTURE)

(ASSEMBLED STATE)

(ENLARGED VIEW ILLUSTRATING MAIN PORTIONS)

(MODIFICATION EXAMPLE)

STRUCTURE OF AIR FLOW CONTROL VALVE AND INTAKE DEVICE

CROSS REFERENCE TO RELATED APPLICATIONS

This application is based on and claims priority under 35 U.S.C. §119 to Japanese Patent Application 2014-012414, filed on Jan. 27, 2014, the entire contents of which are incorporated herein by reference.

TECHNICAL FIELD

This disclosure relates to a structure of an air flow control valve and an intake device, particularly, to a structure of an air flow control valve and an intake device with a plurality of valve main body portions that are respectively provided in each of a plurality of intake ports, and control the flow of a fluid supplied to a combustion chamber of an internal combustion engine.

BACKGROUND DISCUSSION

In the related art, the structure of an air flow control valve with a plurality of valve main body portions that are respectively provided in each of a plurality of intake ports, and control the flow of a fluid supplied to a combustion chamber of an internal combustion engine has been known (for example, refer to EP-1388652 (Reference 1)).

EP-1388652 (Reference 1) discloses the structure of the valve (the structure of the air flow control valve) for opening and closing each of the intake ports in an intake manifold (intake device) with the plurality of intake ports. In the structure of the valve disclosed in EP-1388652 (Reference 1), the plurality of intake ports are respectively provided with a plurality of flaps (valve main body portions), each of which has a curved shape and is disposed so as to be turnable in the intake port, and a plurality of shafts (turning shafts (connecting shafts)), each of which connects the adjacent flaps. Each of the shafts is turnably supported by a bearing structure formed in a wall portion of the intake port. In the configuration of the intake port, an inner circumferential surface (bearing surface) is formed in a bearing portion formed of bearing member pieces which are assembled in such a manner that two pre-split bearing member pieces face each other and the shaft is interposed between the bearing member pieces.

In the structure of the valve (the structure of the air flow control valve) in the intake manifold (intake device) disclosed in EP-1388652 (Reference 1), since the inner circumferential surface (bearing surface) is formed in the bearing portion formed of the bearing member pieces which are assembled in such a manner that the two split bearing member pieces face each other and the shaft is interposed between the bearing member pieces, it is necessary to set a clearance (gap) between an outer surface of the shaft (connecting shaft) and the bearing surface (inner surface) of the bearing portion formed of the bearing member pieces, while taking into consideration an assembly error (a relative positional offset between the bearing member pieces originating from the assembly of the bearing member pieces).

That is, it is necessary to set the clearance (the clearance between the outer surface of the shaft and the bearing surface of the bearing member pieces) to be slightly large so that a given gap is ensured even when the relative positional offset occurs between the bearing member pieces. When the clearance is set to be slightly large, and the shaft turns in a state where an offset (step) is formed between the mating surfaces (the bearing surface) of the bearing member pieces facing each other, the shaft is brought into local contact (partial contact phenomenon) with the bearing surface due to the shape of the step between the bearing surfaces (mating surfaces), and the bearing surface is subjected to wear. When the bearing member pieces are assembled without an occurrence of an assembly error, the gap between the outer surface of the shaft and the bearing surface of the bearing portion increases due to the setting of the clearance (the clearance between the shaft and the bearing portion) to be slightly large, and as a result, backlash of the shaft increases. There is a problem in that when the bearing portion is formed by assembling together a plurality of (two) split bearing member pieces, the bearing surfaces may be subjected to wear due to the stepped shape of the bearing surfaces originating from the assembly error, or the backlash of the shaft (connecting shaft) may increase due to an excessive clearance.

SUMMARY

Thus, a need exists for a structure of an air flow control valve and an intake device which are not suspectable to the drawback mentioned above.

A first aspect of this disclosure is directed to a structure of an air flow control valve including: a plurality of valve main body portions that are respectively provided in a plurality of intake ports, and control the flow of a fluid supplied to combustion chambers of an internal combustion engine; connecting shafts that are provided integrally with the plurality of valve main body portions, and connect the plurality of valve main body portions; a first bearing member that is formed of a single member having a first bearing hole which turnably supports the connecting shaft at a first end of the valve main body portion; and a second bearing member that is provided separately from the first bearing member, and is formed of a single member having a second bearing hole which turnably supports the connecting shaft at a second end of the valve main body portion. The connecting shafts are formed integrally with the plurality of valve main body portions in a state where the first bearing member and the second bearing member are respectively fitted onto the connecting shafts that connect the plurality of valve main body portions.

A second aspect of this disclosure is directed to an intake device including: a plurality of valve main body portions that are respectively provided in a plurality of intake ports of an intake device main body, and control the flow of a fluid supplied to combustion chambers of an internal combustion engine; connecting shafts that are provided integrally with the plurality of valve main body portions, and connect the plurality of valve main body portions; a first bearing member that has a first bearing hole which turnably supports the connecting shaft at a first end of the valve main body portion; and a second bearing member that is provided separately from the first bearing member, and has a second bearing hole which turnably supports the connecting shaft at a second end of the valve main body portion. The connecting shafts are formed integrally with the plurality of valve main body portions in a state where the first bearing member and the second bearing member are respectively fitted onto the connecting shaft between the plurality of valve main body portions.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, an embodiment disclosed here will be described with reference to the accompanying drawings.

First, the configuration of an intake device 100 according to the embodiment disclosed here will be described with reference to FIGS. 1 to 9.

Figure 1:
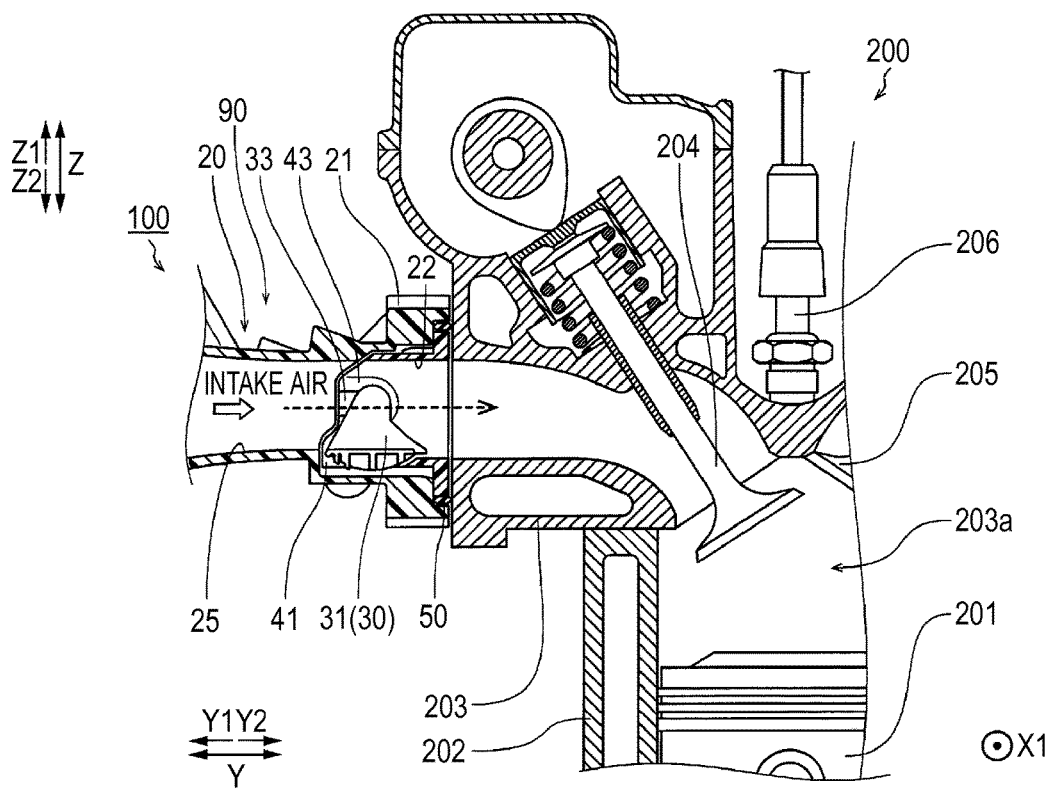
FIG. 1 is a cross-sectional view illustrating a state in which an intake device according to an embodiment of this disclosure is attached to an engine.
Figure 3:
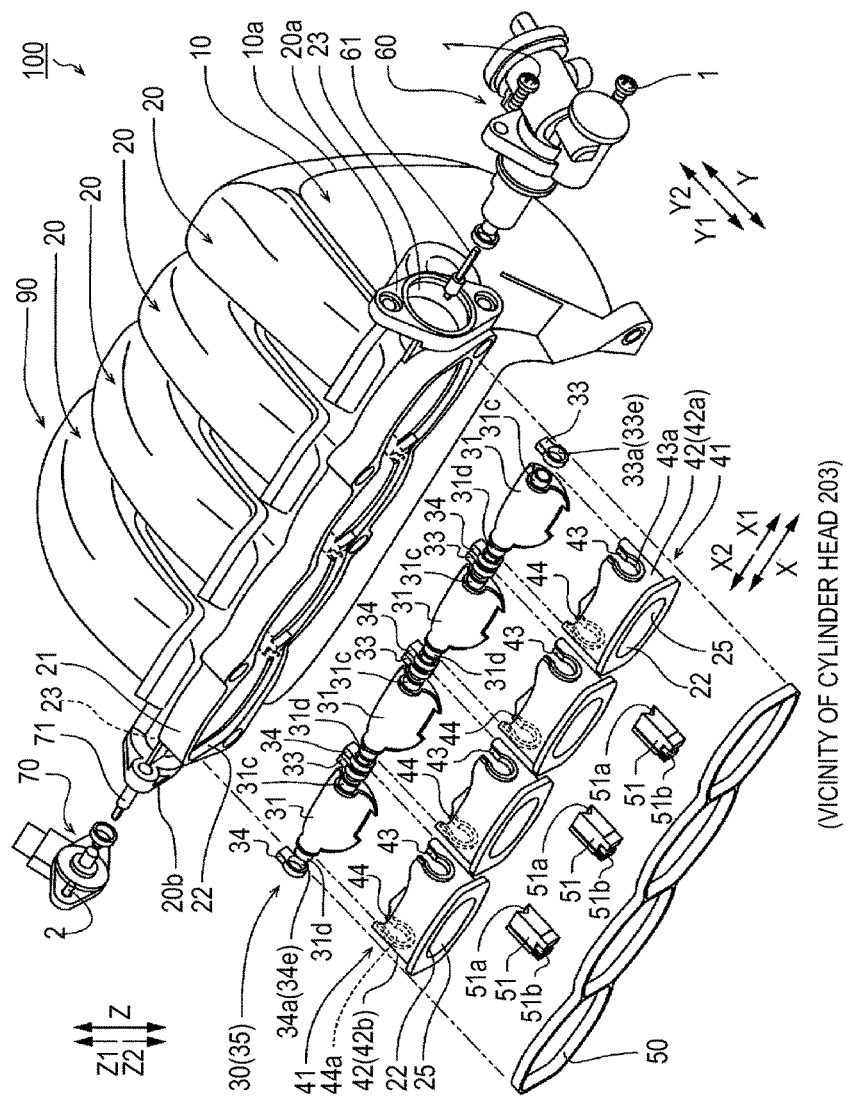
FIG. 3 is an exploded perspective view illustrating the entire configuration of the intake device according to the embodiment of this disclosure.
Figure 4:
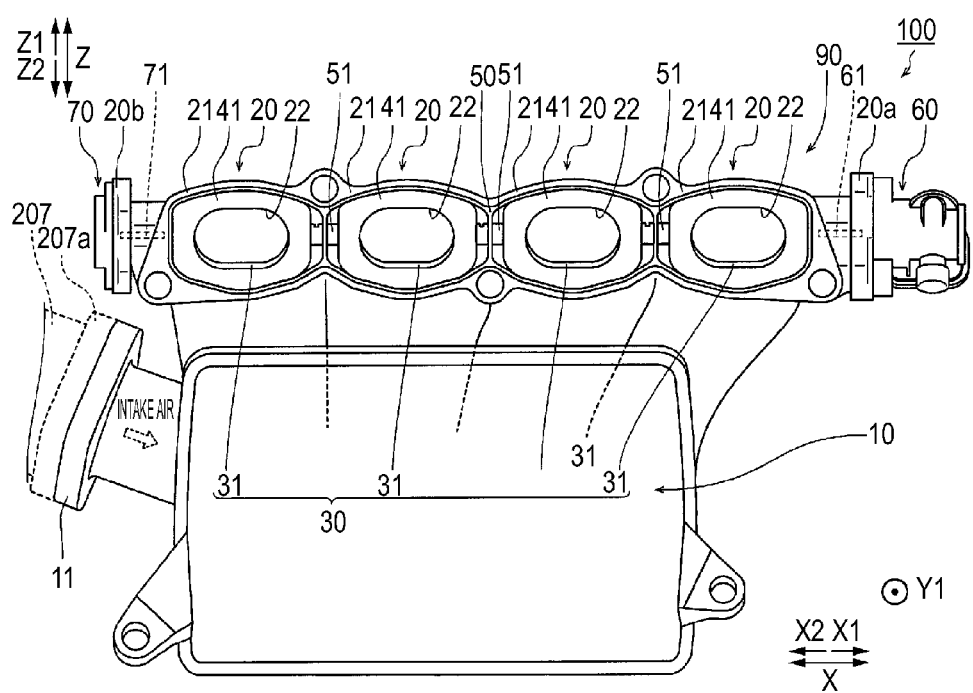
FIG. 4 is a side view of the intake device according to the embodiment of this disclosure when seen from a direction in which the intake device is attached to a cylinder head of the engine.

As illustrated in FIG. 1, the intake device 100 according to the embodiment disclosed here is an intake device mounted on an inline four cylinder engine 200 for a vehicle. As illustrated in FIG. 4, the intake device 100 includes a surge tank 10 made of resin; a plurality of (four) intake ports 20 that are connected to the outlet ports (the ports positioned on a downstream side in the flow direction of intake air) of the surge tank 10, and that branch off from the surge tank 10; and an intake control valve 30 (refer to FIG. 3) that is provided in the vicinity of an outlet port portion of the four intake ports 20. As illustrated in FIG. 3, an intake device main body 90 is made by integrally forming the surge tank 10 and the four intake ports 20 via vibration welding. As illustrated in FIG. 1, with the intake control valve 30 (refer to FIG. 3) assembled into the intake device main body 90, an opening end portion 21 of the intake port 20 is connected to a cylinder head 203 of the engine 200. The engine 200 is an example of an "internal combustion engine" of the embodiment disclosed here. The intake control valve 30 is an example of an "air flow control valve" of the embodiment disclosed here.

As illustrated in FIG. 1, the engine 200 has a structure in which the cylinder head 203 is connected to an upper end (an end positioned in a Z1 direction) of a cylinder block 202 that has pistons 201 built therein. The cylinder head 203 includes intake valves 204 for taking air into combustion chambers 203a; exhaust valves 205 for discharging combustion gas; ignition plugs 206 for igniting an air/fuel mixture in the combustion chambers 203a; and injectors (not illustrated) for supplying fuel to the combustion chambers 203a. With the function of the engine 200, during an intake stroke of the piston 201, the intake valve 204 is opened to take air into the combustion chamber 203a, and the injector supplies fuel into the combustion chamber 203a. Thereafter, subsequent to a compression stroke, the air/fuel mixture in the combustion chamber 203a is burned via the ignition of the air/fuel mixture using the ignition plug 206, an expanding force originating from the combustion is transmitted from the piston 201 to a crankshaft (not illustrated), and a drive force (power) is produced from the crankshaft.

As illustrated in FIG. 4, a connecting portion 11 is formed integrally with the surge tank 10 of the intake device 100, is disposed on an upstream side along the flow of intake air, and is opened to the outside. Here, typically, an air cleaner (not illustrated) and a throttle valve (illustrated by the dotted line) 207 are disposed in an intake air path. The throttle valve 207 is connected to the air cleaner via an air duct (not illustrated) extending from the air cleaner, and an outlet port portion 207a of the throttle valve 207 is connected to the connecting portion 11 of the surge tank 10. The intake air reaches the surge tank 10 via the air cleaner and the throttle valve 207, and flows into the surge tank 10.

The intake ports 20 made of resin are a molded component that is made by integrally forming a root portion (a portion positioned on the upstream side) of each of the intake ports 20, and the root portions of the intake ports 20 are respectively connected to opening portions 10a that are formed from the back surface (the surface positioned on a rear side of the drawing sheet) to the upper surface (the surface positioned on the Z1 direction) of the surge tank 10. The intake ports 20 branch off from each other, and extend from the root portions connected to the surge tank 10 to the tip ends (the ends positioned on the downstream side) connected to the cylinder head 203 (refer to FIG. 1). Openings 22 are formed in the opening end portions 21 of the intake ports 20 connected to the cylinder head 203, and each of the openings 22 has a predetermined opening area (the cross-sectional area of a flow path). Four opening end portions 21 (the openings 22) are disposed in a straight line along an X direction with a predetermined gap held therebetween. As illustrated in FIG. 1, in the configuration of the intake device main body 90, the opening end portions 21 are tightened to an attachment surface of the cylinder head 203 while a gasket 50 (refer to FIG. 3) fitted to the opening end portions 21 of the intake ports 20 is interposed between the opening end portions 21 and the attachment surface.

As illustrated in FIG. 3, an actuator unit 60 and a sensor unit 70 are attached to the intake device 100. The actuator unit 60 drives the intake control valve 30, and the sensor unit 70 detects the opening of the intake control valve 30 and provides feedback for the drive control of the intake control valve 30, which will be described later. Specifically, a through-hole 23 is formed in each of the four intake ports 20 that line up in a straight line in the X direction, and the through-hole 23 passes through a portion of an inner wall surface 25 (refer to FIG. 1) in a straight line in the X direction and slightly on the upstream side (positioned slightly in a Y2 direction) of the opening end portion 21. In a state where the intake control valve 30 (to be described later) (an assembly component 35) is installed inside the intake ports 20 (in the vicinity of the opening end portions 21), the actuator unit 60 is attached to a portion (the portion corresponding to the through-hole 23) of a side surface portion 20a of the intake port 20 at the farthest position in the X1 direction, using screw members 1, and the sensor unit 70 is attached to a portion (the portion corresponding to the through-hole 23) of a side surface portion 20b of the intake port 20 at the farthest position in an X2 direction, using screw members 2. The intake control valve 30 and the actuator unit 60 are connected to each other via a turning shaft 61 that is disposed along the X direction, and the intake control valve 30 and the sensor unit 70 are connected to each other via a turning shaft 71 that is disposed along the X direction. In addition, the inner wall surface 25 is an example of a "wall surface" of the embodiment disclosed here.

Figure 5:
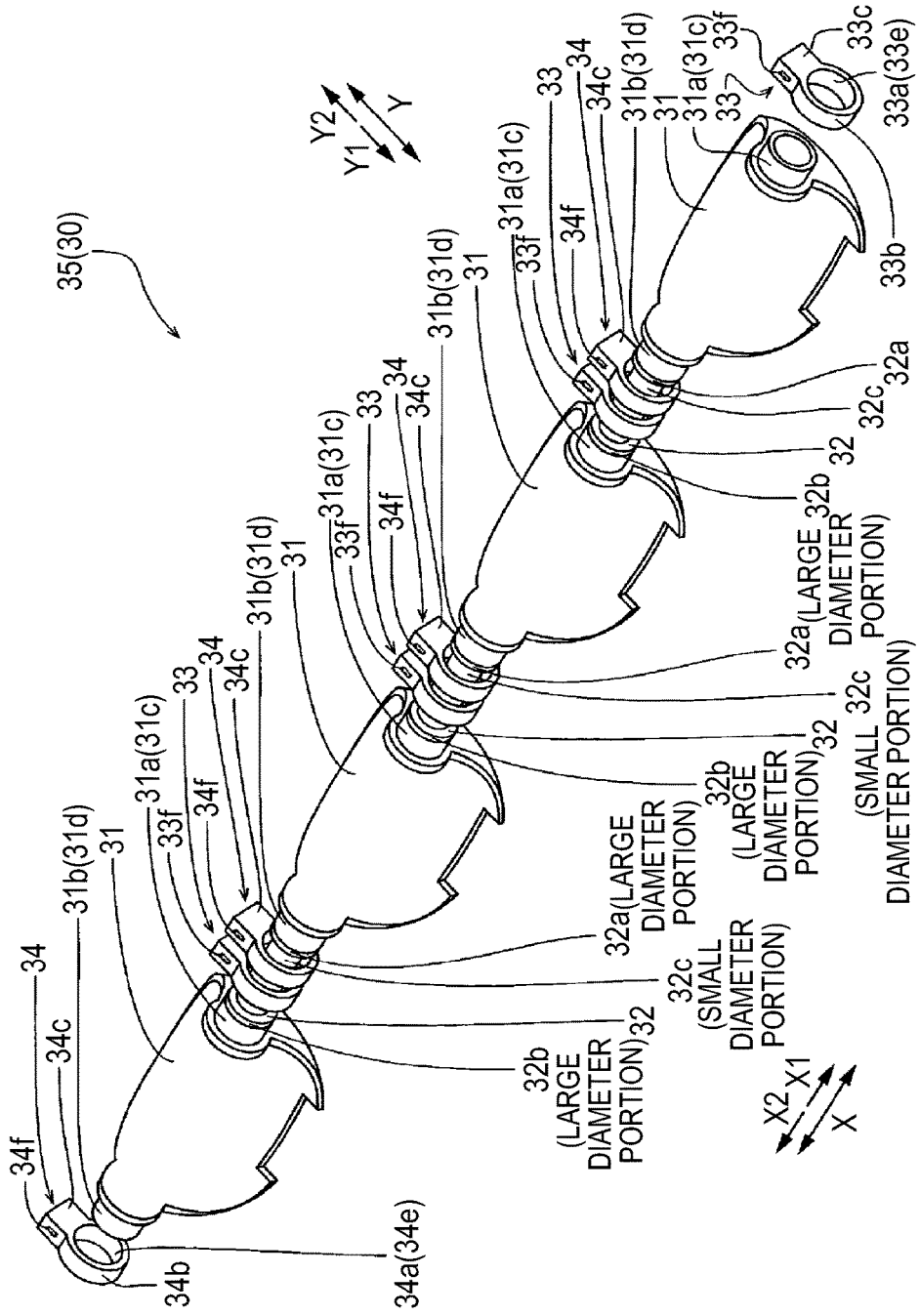
FIG. 5 is a perspective view illustrating the configuration of an assembly component in an intake control valve assembled into the intake device according to the embodiment of this disclosure.

A single assembly component 35 forms the valve structure of the intake control valve 30 that controls the flow (air flow) of intake air supplied to the combustion chambers 203a of the engine 200 in the intake ports 20. As illustrated in FIG. 5, the assembly component 35 includes four valve main bodies 31, each of which controls an area (the cross-sectional area of a flow path) of the opening 22 (refer to FIG. 4) of the intake port 20; a total of 3 turning shaft members 32, each of which connects two valve main bodies 31 that are adjacent to each other in the X direction among the four valve main bodies 31; a bearing member 33 that turnably supports the turning shaft member 32 that is connected to a turning shaft portion 31c at a first end (the end positioned in the X1 direction) 31a of one valve main body 31; and a bearing member 34 that turnably supports another turning shaft member 32 that is connected to a turning shaft portion 31d at a second end (the end positioned in the X2 direction) 31b of the one valve main body 31. The turning shaft portion 31c is also formed at the first end 31a of the valve main body 31 at the farthest position in the X1 direction, and the turning shaft portion 31c is turnably supported by the bearing member 33. Similarly, the turning shaft portion 31d is also formed at the second end 31b of the valve main body 31 at the farthest position in the X2 direction, and the turning shaft portion 31d is turnably supported by the bearing member 34. The intake air is an example of a "fluid" of the embodiment disclosed here. The valve main body 31 is an example of a "valve main body portion" of the embodiment disclosed here. The turning shaft portion 31c, the turning shaft portion 31d, and the turning shaft member 32 are examples of the "connecting shaft" of the embodiment disclosed here. The bearing member 33 and the bearing member 34 are respectively examples of a "first bearing member" and a "second bearing member" of the embodiment disclosed here.

Accordingly, the assembly component 35 is formed of the four valve main bodies 31; the three turning shaft members 32; and four pairs of the bearing members 33 and 34. The four valve main bodies (each valve main body having a curved shape) 31 can be commonly used and have the same shape, the three turning shaft members 32 can be commonly used and have the same shape, and the bearing members 33 and 34 can be commonly used, and have the same shape. However, in the assembly component 35 illustrated in the drawings (FIGS. 3, 5, 6, and the like), different signs are assigned to the portions positioned in different directions, that is, positioned in the X1 direction (at the first end) and in the X2 direction (at the second end), thereby distinguishing the portions from each other.

Figure 7:
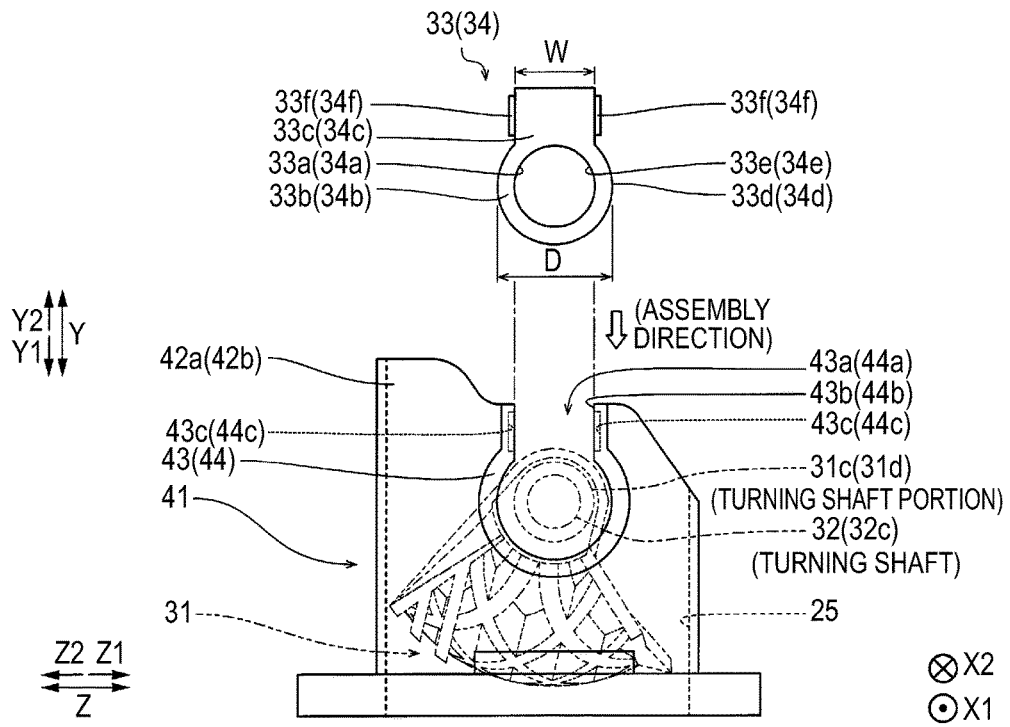
FIG. 7 is a view illustrating a method of assembling the intake control valve (the assembly component) into the intake device according to the embodiment of this disclosure.

Here, as illustrated in FIG. 7, the bearing member 33 is a single member formed of the following portions: a boss portion 33b that is made so as to have a bearing hole 33a, and to have a partial circular arc-shaped exterior appearance; and a rectangular protruding portion 33c that protrudes from another outer surface other than a partial circular arc-shaped outer surface of the boss portion 33b, has a width W (D>W) smaller than an outer diameter D of the boss portion 33b, and extends from the boss portion 33b in a direction (in the Y2 direction) orthogonal to a pass-through direction (the thickness direction (the X direction) of the bearing member 33) of the bearing hole 33a. Similarly, the bearing member 34 is a single member formed of the following portions: a boss portion 34b that is made so as to have a bearing hole 34a, and to have a partial circular arc-shaped exterior appearance; and a protruding portion 34c that has a width W (D>W) smaller than the outer diameter D of the boss portion 34b, and extends from the boss portion 34b in the Y2 direction orthogonal to a pass-through direction (the thickness direction of the bearing member 34) of the bearing hole 34a. The bearing hole 33a and the bearing hole 34a have a smooth circular circumferential bearing surface 33e and a smooth circular circumferential bearing surface 34e, both of which turnably support the connecting shaft 32, respectively. The bearing hole 33a and the bearing hole 34a are examples of a "first bearing hole" and a "second bearing hole" of the embodiment disclosed here, respectively. The boss portions 33b and 34b are examples of a "first engaging portion" of the embodiment disclosed here. The protruding portions 33c and 34c are examples of a "second engaging portion" of the embodiment disclosed here.

In the embodiment, as illustrated in FIG. 5, the assembly component 35 is made by forming the turning shaft members 32 integrally with the respective valve main bodies 31, in a state where the turning shaft members (the turning shaft member connecting two of the four adjacent valve main bodies 31) 32 are fitted into the bearing hole 33a of the bearing member 33 and the bearing hole 34a of the bearing member 34. That is, in a state where the turning shaft member 32 (a small-diameter portion 32c) (the turning shaft member being connected to the turning shaft portion 31c at the first end (the end positioned in the X1 direction) 31a of one valve main body 31 is fitted into the bearing hole 33a of the bearing member 33, and the turning shaft member 32 (the small-diameter portion 32c) (the turning shaft member being connected to the turning shaft portion 31d at the second end (the end positioned in the X2 direction) 31b of the one valve main body 31) is pre-fitted into the bearing hole 34a of the bearing member 34, the turning shaft members 32 are formed integrally with the respective valve main bodies 31. Accordingly, for the formation of the assembly component 35, the turning shaft members 32 (the small-diameter portions 32c) connecting two valve main bodies 31 are respectively fitted into the bearing member 34 positioned in the X1 direction, and the bearing member 33 positioned in the X2 direction.

In the embodiment, the four valve main bodies 31 are made of resin (for example, polyamide), and the three turning shaft members 32 are made of metal (for example, an aluminum alloy). The assembly component 35 is made by forming the three turning shaft members 32 integrally with the four valve main bodies 31 via insertion molding when the valve main bodies 31 are resin molded, in a state where the turning shaft members 32 made of metal are respectively pre-fitted into the bearing hole 33a of the bearing member 33 and the bearing hole 34a of the bearing member 34.

In the configuration of the assembly component 35, in a state where the four valve main bodies 31 are formed integrally with the three turning shaft members 32 connecting the valve main bodies 31, via insertion molding, the bearing member (the bearing member being fitted onto the turning shaft member 32 that is disposed in the X1 direction while facing the bearing member) 33 is installed at a first end (the end positioned in the X1 direction) 42a of a frame member 41 that is a part of the inner wall surface 25 (refer to FIG. 1) of the intake port 20. In addition, the bearing member (the bearing member being fitted onto the turning shaft member 32 that is disposed in the X2 direction (on the opposite side) while facing the bearing member) 34 is installed at a second end (the end positioned in the X2 direction) 42b of the frame member 41. As illustrated in FIG. 3, in a state where the valve main bodies 31 and the turning shaft members 32 (refer to FIG. 5) are integrated with each other, the bearing members 33 are respectively installed at the first ends (the ends positioned in the X1 direction) 42a of the frame members 41, and the bearing members 34 are respectively installed at the second ends (the ends positioned in the X2 direction) 42b of the frame members 41, the assembly component 35 is assembled into the intake ports 20 of the intake device main body 90 via the frame members 41. The frame member 41 is an example of a "wall surface member" of the embodiment disclosed here.

In the assembly component 35, the turning shaft members 32 are formed integrally with the four valve main bodies 31, in a state where the bearing member 33 is fitted onto the turning shaft member 32 so as to be movable in an axial direction (in the X2 direction), and the bearing member 34 is fitted onto the turning shaft member 32 so as to be movable in the axial direction (in the X1 direction). The bearing member 33 and the bearing member 34 are respectively installed at the first end 42a and the second end 42b of a main body portion 42 (to be described later) of the frame member 41 by moving the bearing member 33 along the turning shaft member 32 in the X2 direction, and by moving the bearing member 34 along the turning shaft member 32 in the X1 direction in a state where the turning shaft members (the turning shaft members being fitted into the bearing members 33 and 34) 32 are formed integrally with the four valve main bodies 31 (in a state where the turning shaft members 32 and the valve main bodies 31 are integrally formed into the assembly component 35 via insertion molding).

Figure 6:
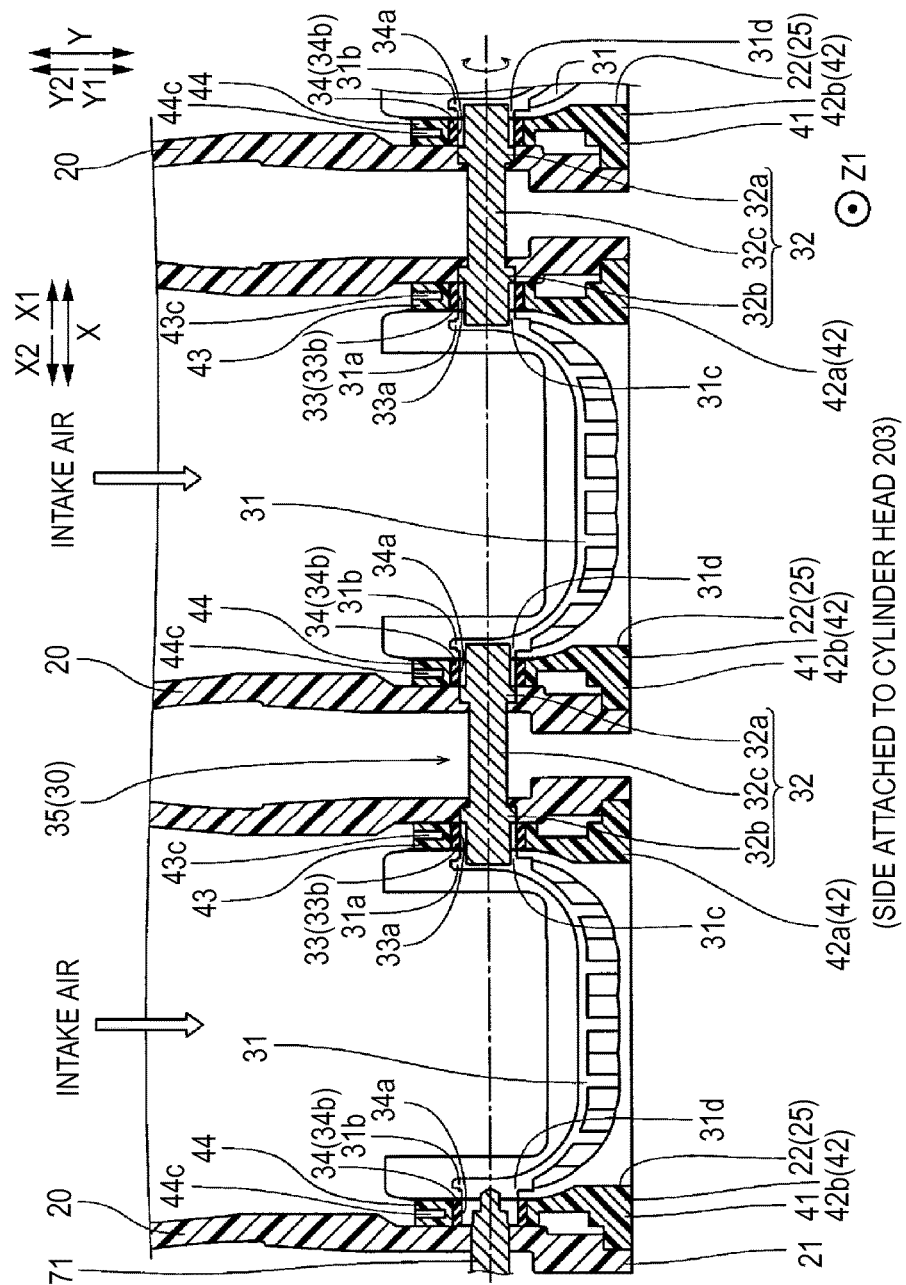
FIG. 6 is a cross-sectional view illustrating a state in which the intake control valve (the assembly component) is assembled into the intake device according to the embodiment of this disclosure.
Figure 9:
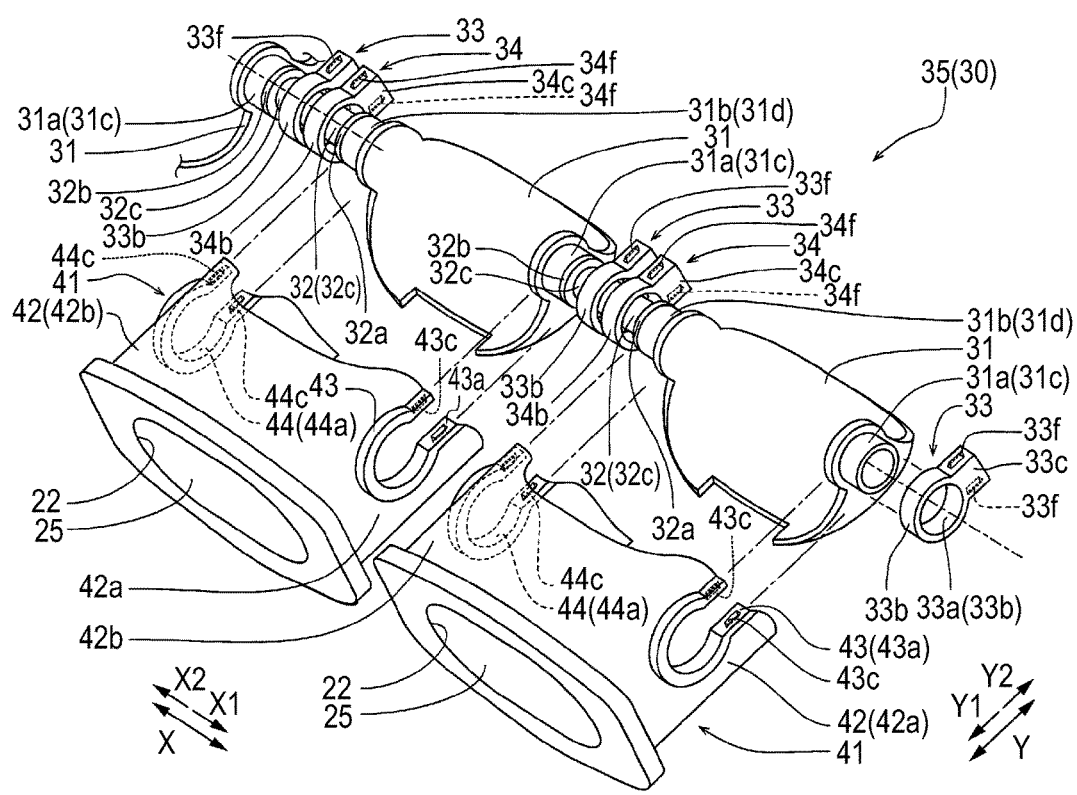
FIG. 9 is an enlarged view of main portions for illustrating the method of assembling the intake control valve (the assembly component) into the intake device according to the embodiment of this disclosure.

As illustrated in FIG. 9, in the state where the turning shaft member 32 is insertion-molded into the valve main body 31, a flange-shaped large-diameter portion 32a in an end portion (the end portion positioned in the X1 direction) of the turning shaft member 32 is seamlessly connected to the turning shaft portion 31d. A flange-shaped large-diameter portion 32b in an end portion (the end portion positioned in the X2 direction) of the turning shaft member 32 is seamlessly connected to the turning shaft portion 31c. That is, the large-diameter portion 32a and the turning shaft portion 31d have the same outer diameter, and the large-diameter portion 32b and the turning shaft portion 31c have the same outer diameter. As illustrated in FIGS. 6 and 9, in the turning shaft member 32, the large-diameter portions 32a and 32b have an outer diameter greater than that of the small-diameter portion 32c. The large-diameter portions 32a and 32b of the turning shaft member 32 are examples of the "connecting shaft" of the embodiment disclosed here.

The bearing member 33 moves on the large-diameter portion 32b along the turning shaft member 32 in the X2 direction, and reaches the turning shaft portion 31c at the first end 31a of the valve main body 31. As illustrated in FIG. 6, in the state where the bearing member 33 is installed at the first end 42a of the frame member 41, the smooth circular circumferential bearing surface 33e of the bearing hole 33a of the bearing member 33 is slidably in contact with the turning shaft portion 31c of the valve main body 31 with an appropriate clearance between the bearing surface 33e and the turning shaft portion 31c. Similarly, the bearing member 34 moves on the large-diameter portion 32a along the turning shaft member 32 in the X1 direction, and reaches the turning shaft portion 31d at the second end 31b of the valve main body 31. As illustrated in FIG. 6, in the state where the bearing member 34 is installed at the second end 42b of the frame member 41, the smooth circular circumferential bearing surface 34e of the bearing hole 34a of the bearing member 34 is slidably in contact with the turning shaft portion 31d of the valve main body 31 with an appropriate clearance between the bearing surface 34e and the turning shaft portion 31d.

In the assembly component 35 according to the embodiment, in a state where the bearing member 33 is installed in a bearing member installation portion (the portion positioned in the X1 direction) 43 of the frame member 41, and the bearing member 34 is installed in a bearing member installation portion (the portion positioned in the X2 direction) 44 of the frame member 41, the frame members 41 are assembled into the intake device main body 90 at a predetermined position.

As illustrated in FIG. 9, the frame member 41 includes the main body portion 42 that forms the shape of the inner wall surface 25 of the opening 22 in the vicinity of the opening end portion 21 (refer to FIG. 1) of the intake port 20; the bearing member installation portion 43 that is formed at the first end (the end positioned in the X1 direction) 42a of the main body portion 42; and the bearing member installation portion 44 that is formed at the second end (the end positioned in the X2 direction) 42b of the main body portion 42. The bearing member installation portion 43 has an engagement hole 43a that passes through the bearing member installation portion 43 in a thickness direction (in the X direction) and is made by cutting the bearing member installation portion 43 into the shape of a keyhole in a plan view (refer to FIG. 7). The bearing member installation portion 44 has an engagement hole 44a that passes through the bearing member installation portion 44 in a thickness direction (in the X direction) and is made by cutting the bearing member installation portion 44 into the shape of a keyhole in a plan view (refer to FIG. 7). That is, the bearing member installation portion 43 has a shape corresponding to the shape of the exterior appearance of the bearing member 33, and the bearing member installation portion 44 has a shape corresponding to the shape of the exterior appearance of the bearing member 34. The bearing member installation portion 43 and the bearing member installation portion 44 are examples of a "first bearing installation portion" and a "second bearing installation portion" of the embodiment disclosed here.

Figure 8:
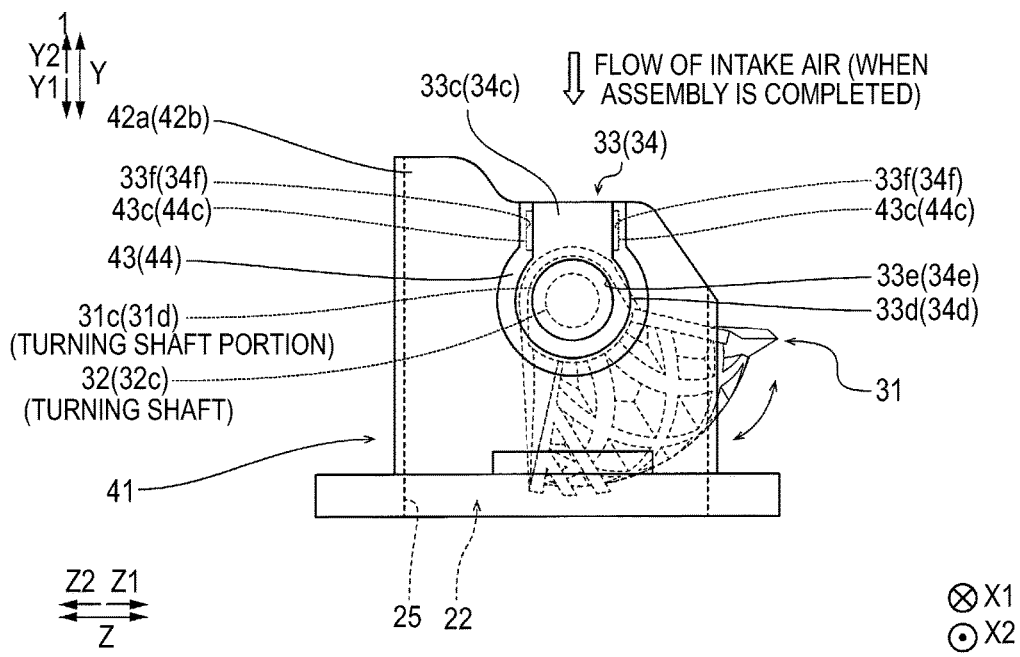
FIG. 8 is a view illustrating a state in which the intake control valve (the assembly component) is assembled into the intake device according to the embodiment of this disclosure.

Accordingly, in the embodiment, in the state where the boss portion 33b and the protruding portion 33c of the bearing member 33 formed of a single member are fitted into the engagement hole 43a of the bearing member installation portion 43, and the boss portion 34b and the protruding portion 34c of the bearing member 34 formed of a single member are fitted into the engagement hole 44a of the bearing member installation portion 44, the bearing member 33 does not fall out of the bearing member installation portion 43 in the Y2 direction orthogonal to the turning shaft member 32, and the bearing member 34 does not fall out of the bearing member installation portion 44 in the Y2 direction orthogonal to the turning shaft member 32. That is, as illustrated in FIG. 8, since the outer diameter D (refer to FIG. 7) of the boss portion 33b is greater than the width W (refer to FIG. 7) of the protruding portion 33c, and the outer diameter D (refer to FIG. 7) of the boss portion 34b is greater than the width W (refer to FIG. 7) of the protruding portion 34c, both of the bearing members 33 and 34 do not fall out of the frame member 41 in the Y2 direction. The Y2 direction is an example of a "first direction" of the embodiment disclosed here.

As illustrated in FIG. 7, an outer surface 33d of the protruding portion 33c of the bearing member 33 has a convex portion 33f that is formed into a convex shape. Similarly, an outer surface 34d of the protruding portion 34c of the bearing member 34 also has a convex portion 34f that is formed into a convex shape. An inner surface 43b of the engagement hole 43a of the bearing member installation portion 43 has a concave portion 43c that is formed into a concave shape, and the concave portion 43c is positioned so as to correspond to the position of the convex portion 33f on the outer surface 33d of the protruding portion 33c. Similarly, an inner surface 44b of the engagement hole 44a of the bearing member installation portion 44 has a concave portion 44c that is formed into a concave shape, and the concave portion 44c is positioned so as to correspond to the position of the convex portion 34f on the outer surface 34d of the protruding portion 34c.

The outer surface 33d (the convex portion 33f) of the bearing member 33 and the inner surface 43b (the concave portion 43c) of the bearing member installation portion (the portion being fitted into the outer surface 33d (the convex portion 33f)) 43 are formed so as to be fittable into each other. The outer surface 34d (the convex portion 34f) of the bearing member 34 and the inner surface 44b (the concave portion 44c) of the bearing member installation portion (the portion being fitted into the outer surface 34d (the convex portion 34f)) 44 are formed so as to be fittable into each other. That is, the bearing member 33 is snap-fitted into the bearing member installation portion 43, and the bearing member 34 is snap-fitted into the bearing member installation portion 44.

Accordingly, in the embodiment, as illustrated in FIG. 8, in the state where the bearing member 33 is fitted into the bearing member installation portion 43, and the bearing member 34 is fitted into the bearing member installation portion 44, the engagement between the convex portion 33f and the concave portion 43c is maintained, and the engagement between the convex portion 34f and the concave portion 44c is maintained. As a result, the bearing member 33 does not fall out of the bearing member installation portion 43 along the extension direction (the X1 direction) of the turning shaft member 32, and the bearing member 34 does not fall out of the bearing member installation portion 44 along the extension direction (the X2 direction) of the turning shaft member 32. The X1 direction and the X2 direction are examples of a "second direction" of the embodiment disclosed here.

As such, in the embodiment, the bearing member 33 and the bearing member installation portion (the portion having a shape corresponding to the shape of the exterior appearance of the bearing member 33) 43 of the frame member 41 are formed so as to be fittable into each other, while having shapes by which the installation of the bearing member 33 into the bearing member installation portion 43 is unlikely to be released. Similarly, the bearing member 34 and the bearing member installation portion (the portion having a shape corresponding to the shape of the exterior appearance of the bearing member 34) 44 of the frame member 41 are formed so as to be fittable into each other, while having shapes by which the installation of the bearing member 34 into the bearing member installation portion 44 is unlikely to be released.

As illustrated in FIG. 3, in the state where the assembly component 35 and four frame members 41 are assembled with the intake device main body 90, the turning shaft member 32 of the assembly component 35 is turnably held by a spacer member 51 that is inserted in the Y2 direction. That is, the spacer member 51 is disposed in such a manner that a bearing portion 51a (the portion positioned in the Y2 direction) of the spacer member 51 smoothly slides against an outer surface of the small-diameter portion 32c (refer to FIG. 6) of the turning shaft member 32. The spacer member 51 is provided with a groove portion 51b on the opposite side (in the Y1 direction) of the bearing portion 51a, and the groove portion 51b extends in the vertical direction (in a Z direction), and is concave in the Y2 direction. The intake device main body 90 has the following configuration: in a state where the spacer member 51 is installed, the opening end portion 21 is tightened to the attachment surface of the cylinder head 203 (refer to FIG. 1) with a gasket (a part of the gasket being fitted into the opening end portion 21 of the intake port 20 and the groove portion 51b of the spacer member 51) 50 interposed therebetween.

The intake device 100 controls the opening area (the cross-sectional area of a flow path of the opening 22 (refer to FIG. 4)) of the intake air path of each of the four intake ports 20 when taking air into the combustion chamber 203a via the operation of the intake control valve 30, and thereby the intake device 100 produces longitudinal vortexes (tumble flow) or transverse vortexes (swirl flow) in the combustion chamber 203a, and improves the combustion efficiency of the engine 200.

Figure 2:
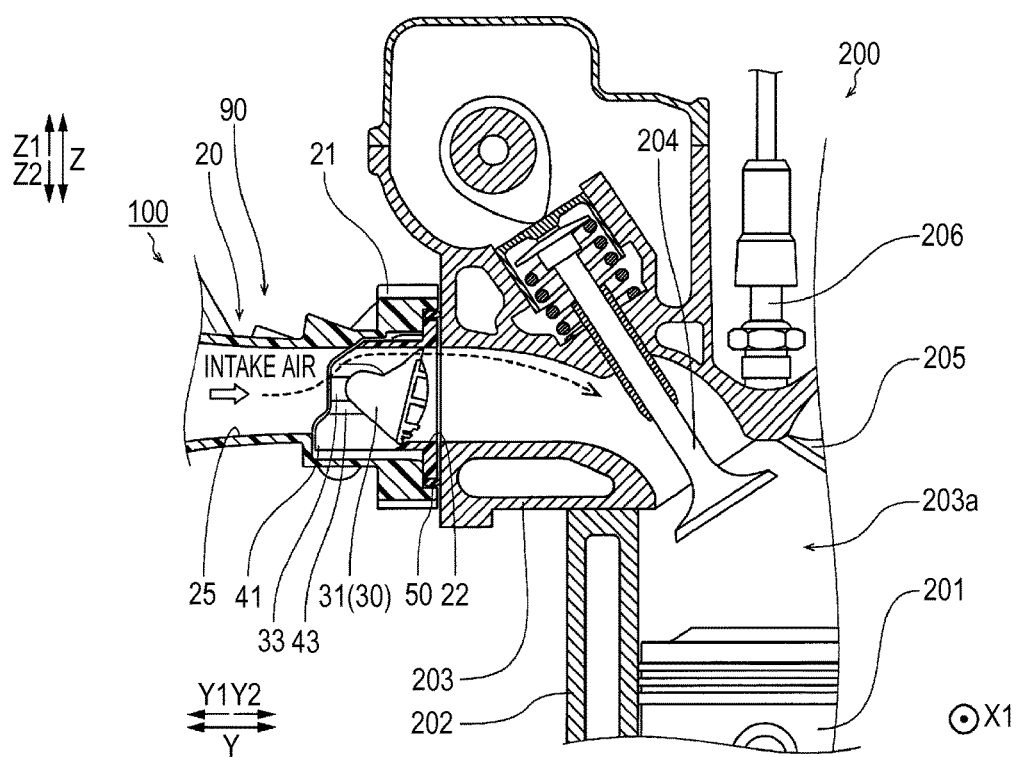
FIG. 2 is a cross-sectional view illustrating a state in which the intake device according to the embodiment of this disclosure is attached to the engine.

Specifically, when the posture of the valve main body 31 is set to an open posture illustrated in FIG. 1 via the operation of the actuator unit 60, the valve main body 31 takes a posture so as to be parallel with a bottom surface of the frame member 41 while being positioned close to the bottom surface (the surface positioned in the Z2 direction) of the frame member 41. At this time, the area (the cross-sectional area of the flow path) of the opening 22 of the opening end portion 21 of the intake port 20 is increased to the maximum. When the entirety of the intake control valve 30 including the turning shaft member 32 turns via the opposite directional operation of the actuator unit 60, and the posture of the valve main body 31 is set to a restricting posture (illustrated in FIG. 2) so as to control (restrict) the flow of non-restricted (refer to FIG. 1) intake air, the valve main body 31 is displaced, while rising from the bottom surface of the frame member 41. At this time, the area (the cross-sectional area of the flow path) of the opening 22 of the opening end portion 21 of the intake port 20 is adjusted so as to be decreased. FIG. 2 illustrates a state in which the valve main body 31 turns to the position in which the area of the opening 22 becomes the minimum, and it is possible to control the valve main body 31 to be in the position of an intermediate posture between the posture illustrated in FIG. 1 and the posture illustrated in FIG. 2.

In order to control air flow via the intake control valve 30, the actuator unit 60 controls posture of the intake control valve 30 based on information taken from an operation map (not illustrated) which is a function of the rotation speed of the engine 200 and load conditions. At this time, the information of the opening of the intake control valve 30 detected by the sensor unit 70 is provided as feedback for the drive control of the intake control valve 30, and the posture of the intake control valve 30 is repeatedly controlled. The intake device 100 is configured in this manner.

Subsequently, a process of assembling the intake control valve 30 with the intake device main body 90 will be described with reference to FIGS. 1 and 3, and FIGS. 5 to 9.

First, as illustrated in FIG. 5, the assembly component 35 is formed via insertion molding, in which the valve main body 31 made of resin and the turning shaft member 32 made of metal line up in a straight line. Here, as described above, the assembly component 35 is made via insertion molding in a state where the small-diameter portions 32c of the turning shaft members 32 made of metal are respectively pre-inserted into the bearing members 33 and 34. At this point of time immediately after the insertion-molding is completed, the bearing member 33 is not fitted into the first end 31a (the turning shaft portion 31c) of the valve main body 31 at the farthest position in the X1 direction, and the bearing member 34 is not fitted into the second end 31b (the turning shaft portion 31d) of the valve main body 31 at the farthest position in the X2 direction.

Thereafter, the bearing member 33 is fitted into the turning shaft portion 31c of the valve main body 31 by moving the small-diameter portion 32c and the large-diameter portion 32a that are fitted into the bearing member 33, and the bearing member 34 is fitted into the turning shaft portion 31d of the valve main body 31 by moving the small-diameter portion 32c and the large-diameter portion 32b that are fitted into the bearing member 34. The assembly component 35 (insertion-molded component) assembled in this manner is installed on the frame member 41.

Specifically, as illustrated in FIG. 9, the bearing member (the member being fitted into the turning shaft portion 31c at the first end 31a (the end positioned in the X1 direction) of the valve main body 31) 33 is installed on the bearing member installation portion 43 at the first end 42a of the frame member 41. At the same time, the bearing member (the member being fitted into the turning shaft portion 31d at the second end 31b (the end positioned in the X2 direction) of the valve main body 31) 34 is installed on the bearing member installation portion 44 at the second end 42b of the frame member 41. The four frame members 41 are installed in the same manner.

At this time, as illustrated in FIGS. 7 and 8, the boss portion 33b and the protruding portion 33c of the bearing member 33 are fitted into the engagement hole 43a of the bearing member installation portion 43, and the boss portion 34b and the protruding portion 34c of the bearing member 34 are fitted into the engagement hole 44a of the bearing member installation portion 44. In the state where the bearing member 33 is fitted into the bearing member installation portion 43, the convex portion 33f of the bearing member 33 engages with the concave portion 43c of the bearing member installation portion 43 via snap fitting. Similarly, in the state where the bearing member 34 is fitted into the bearing member installation portion 44, the convex portion 34f of the bearing member 34 engages with the concave portion 44c of the bearing member installation portion 44 via snap fitting.

Thereafter, in a state where the assembly component 35 is installed on the frame members 41, the four frame members 41 (refer to FIG. 3) are respectively inserted into the openings 22 of the opening end portions 21 of the four intake ports 20 in the Y2 direction (refer to FIG. 3). Accordingly, as illustrated in FIG. 6, the assembly component 35 and the frame members 41 are together disposed in the intake ports 20.

Thereafter, as illustrated in FIG. 3, the actuator unit 60 is attached to the side surface portion 20a using the screw members 1, with the turning shaft 61 inserted into the end portion (the portion positioned in the X1 direction) of the intake control valve 30, and the sensor unit 70 is attached to the side surface portion 20b using the screw members 2, with the turning shaft 71 inserted into the end portion (the portion positioned in the X2 direction) of the intake control valve 30. The spacer member 51 is inserted between the intake ports 20 so as to hold the small-diameter portion 32c (refer to FIG. 6) of the turning shaft member 32, while the bearing portion 51a is positioned at a tip end (in the Y2 direction), and in a state where the spacer member 51 is installed, the gasket 50 is attached to the intake device main body 90 in such a manner that a part of the gasket 50 is fitted into the opening end portion 21 of the intake port 20 and the groove portion 51b of the spacer member 51. The intake control valve 30 is assembled with the intake device main body 90 in this manner.

Finally, as illustrated in FIG. 1, the intake device 100 with which the intake control valve 30 is assembled is tightened to the cylinder head 203 of the engine 200 with the gasket 50 interposed therebetween.

In the embodiment, it is possible to obtain the following effects.

That is, in the embodiment, as described above, the intake control valve 30 includes the plurality of valve main bodies 31; the turning shaft members 32 that are formed integrally with the plurality of valve main bodies 31; the bearing member 33 formed of a single member that has the bearing hole 33a which turnably supports the turning shaft member 32 at the first end 31a of the valve main body 31; and the bearing member 34 formed of a single member that has the bearing hole 34a which turnably supports the turning shaft member 32 at the second end 31b of the valve main body 31. The turning shaft members 32 are formed integrally with the plurality of valve main bodies 31 in a state where the bearing members 33 and 34 are respectively fitted onto the turning shaft members 32 that connect the plurality of valve main bodies 31, and thereby it is possible to turn the assembly component 35 (the intake control valve 30) (the component in which the valve main body 31 and the turning shaft member 32 are connected to each other and are integrated into each other) in the intake ports 20, while the bearing member 33 formed of a single member or the bearing member 34 formed of a single member is fitted onto the turning shaft member 32, and an appropriate clearance therebetween is reliably ensured. That is, for example, when the bearing surface of the turning shaft member 32 is formed with bearing member pieces (the pieces being split into two components (members)) facing each other, it is necessary to set a clearance more than necessary between the turning shaft member 32 and the bearing surface, while taking into consideration an assembly error (a relative positional offset between the bearing member pieces originating from the assembly of the bearing member pieces). In contrast, in the embodiment, since the bearing member 33 is formed of a single member in which the smooth bearing surface 33e is pre-formed as the bearing hole 33a, and the bearing member 34 is formed of a single member in which the smooth bearing surface 34e is pre-formed as the bearing hole 34a, it is possible to reliably maintain a clearance of a necessary minimum size (a given value) between the outer surface of the turning shaft portion 31c at the first end 31a of the valve main body 31 and the bearing surface 33e of the bearing member 33, and between the outer surface of the turning shaft portion 31d at the second end 31b of the valve main body 31 and the bearing surface 34e of the bearing member 34. Accordingly, during the operation of the intake control valve 30, since the appropriate clearance between the turning shaft portion 31c and the bearing member 33, and between the turning shaft portion 31d and the bearing member 34 is reliably ensured, it is possible to prevent the backlash of each of the turning shaft portion 31c and the turning shaft member 32 (the member turning integrally with the turning shaft portion 31c) with respect to the bearing member 33, and to prevent the backlash of each of the turning shaft portion 31d and the turning shaft member 32 (the member turning integrally with the turning shaft portion 31d) with respect to the bearing member 34.

For example, when the two split bearing member pieces are used, and the turning shaft member 32 turns in a state where an offset (step) is formed between the mating surfaces (the bearing surfaces) of the bearing member pieces facing each other, the turning shaft portions 31c and 31d are respectively brought into local contact (partial contact phenomenon) with the bearing surfaces due to the shape of the step between the mating surfaces, and the bearing surface of the bearing member pieces is subjected to wear. In contrast, in the embodiment, since the bearing member 33 is formed of a single member in which the smooth bearing surface 33e of the bearing hole 33a is pre-formed, and the bearing member 34 is formed of a single member in which the smooth bearing surface 34e of the bearing hole 34a is pre-formed, it is possible to prevent at least the bearing surfaces 33e and 34e from being subjected to wear originating from abnormal slide resistance. As a result, in the structure of the intake control valve 30, the appropriate clearance is reliably ensured between the turning shaft portion 31c and the bearing member 33, and between the turning shaft portion 31d and the bearing member 34, and thereby it is possible to prevent the wear of the bearing surface 33e (34e) of the bearing member 33 (34), and to prevent the backlash of the turning shaft portions 31c and 31d (the turning shaft member 32) made of resin. Since the backlash between the bearing member 33 (34) and the turning shaft portions 31c and 31d (the turning shaft member 32) is prevented, it is possible to prevent the occurrence of an abnormal sound (a "clack-clack" tapping sound), and it is possible to smoothly turn the valve main body portion 31 in the intake port 20.

In the embodiment, the plurality of valve main bodies 31 are made of resin, and the turning shaft member 32 is made of metal. The turning shaft members 32 made of metal are formed integrally with the plurality of valve main bodies 31 via insertion molding when the plurality of valve main bodies 31 are resin molded in a state where the bearing member 33 and the bearing member 34 are fitted onto the turning shaft member 32. Accordingly, when the insertion-molded component (the assembly component 35) (the component in which the valve main bodies 31 made of resin and the turning shaft members 32 made of metal are connected to each other) turns in the intake ports 20, it is possible to turnably support the entirety of the turning shaft portion 31c and the turning shaft portion 31d, while reliably ensuring the appropriate clearance between the outer surface of the turning shaft portion 31c and the bearing surface 33e of the bearing member 33, and between the outer surface of the turning shaft portion 31d and the bearing surface 34e of the bearing member 34. Accordingly, during the operation of the intake control valve 30, it is possible to effectively reduce the slide resistance of each of the turning shaft portions 31c and 31d. To the extent that the slide resistance of each of the plurality of turning shaft portions 31c and 31d is reduced, it is possible to reduce the size of the actuator unit 60 that turns the intake control valve 30 (the assembly component 35) that includes the plurality of valve main body portions 31 and the turning shaft members 32.

The embodiment further includes the frame member 41 in which the bearing member 33 and the bearing member 34 (the members being fitted onto the turning shaft members 32 that are formed integrally with the plurality of valve main bodies 31) are respectively installed at the first end 42a and the second end 42b of the main body portion 42, and which forms the inner wall surface 25 of the intake port 20. Accordingly, it is possible to install the bearing member 33 at the first end 42a of the frame member 41 while maintaining the appropriate clearance between the outer surface of the turning shaft portion 31c and the bearing surface 33e of the bearing hole 33a, and it is possible to install the bearing member 34 at the second end 42b of the frame member 41 while maintaining the appropriate clearance between the outer surface of the turning shaft portion 31d and the bearing surface 34e of the bearing hole 34a. Accordingly, it is possible to easily manufacture the structure of the intake control valve 30 for controlling the flow of a fluid (intake air) in the plurality of intake ports 20, using the assembly component 35 in which the turning shaft members 32 are formed integrally with the plurality of valve main bodies 31, and which has the bearing structure appropriate for each of the turning shaft members 32 (the turning shaft portions 31c and 31d).

In the embodiment, the turning shaft members 32 are formed integrally with the plurality of valve main bodies 31 in a state where the bearing members 33 and 34 are respectively fitted onto the turning shaft members 32 so as to be movable in the axial direction. The bearing member 33 and the bearing member 34 are respectively installed at the first end 42a and the second end 42b of the frame member 41 by moving the bearing members 33 and 34 in the axial direction (in the X2 direction and in the X1 direction) of the turning shaft member 32 in a state where the turning shaft members 32 (the members being respectively fitted into the bearing members 33 and 34) are formed integrally with the plurality of valve main bodies 31. Accordingly, when the bearing member 33 (the member, into the bearing hole 33a of which the turning shaft member 32 is pre-fitted) and the bearing member 34 (the member, into the bearing hole 34a of which the turning shaft member 32 is pre-fitted) are actually moved in the axial direction (in the X2 direction and in the X1 direction), it is possible to easily install the bearing member 33 at the first end 42a of the frame member 41, and to easily install the bearing member 34 at the second end 42b of the frame member 41. Accordingly, even when the assembly component 35 (the intake control valve 30) (the component in which the valve main bodies 31 and the turning shaft members 32 are connected to each other in the X direction and are integrated into each other) is used so as to control the air flow of the plurality of intake ports 20, it is possible to obtain the structure of the intake control valve 30 by easily assembling the assembly component 35 into the frame members 41 (the members forming the inner wall surfaces 25 of the plurality of intake ports 20, respectively) in a state where the turning shaft members 32 are formed integrally with the plurality of valve main bodies 31, and the bearing structure appropriate for each of the turning shaft members 32 (the turning shaft portion 31*c* and the large-diameter portion 32*b*, and the turning shaft portion 31*d* and the large-diameter portion 32*a*) is obtained.

In the embodiment, in a state where the bearing member 33 (the member being fitted into the turning shaft portion 31*c*) and the bearing member 34 (the member being fitted into the turning shaft portion 31*d*) are installed on the frame member 41, the frame members 41 are assembled into the intake device main body 90. Accordingly, it is possible to easily assemble the assembly component 35 (the component in which the valve main body 31 is turnably assembled with the frame member 41 using the bearing members 33 and 34, and which has the bearing structure appropriate for the turning shaft portions 31*c* and 31*d*) with the intake device main body 90 via the frame members 41. That is, it is possible to easily obtain the structure of the intake control valve 30 by assembling the frame members 41 into the intake device main body 90 in a state where the appropriate clearance is maintained between the outer surface of the turning shaft portion 31*c* and the bearing surface 33*e* of the bearing member 33, and between the outer surface of the turning shaft portion 31*d* and the bearing surface 34*e* of the bearing member 34. As a result, it is possible to improve the efficiency of an operator who assembles the intake device 100 in the manufacturing of the air flow control valve having a high quality bearing structure.

In the embodiment, the bearing member 33 and the bearing member 34 are respectively installed at the first end 42*a* and the second end 42*b* of the frame member 41, and the frame member 41 includes the bearing member installation portion 43 having a shape that corresponds to the shape of the exterior appearance of the bearing member 33, and the bearing member installation portion 44 having a shape that corresponds to the shape of the exterior appearance of the bearing member 34. Accordingly, in a state where the bearing structure appropriate for the outer surface of each of the turning shaft portions 31*c* and 31*d* is obtained by installing the bearing members 33 and 34 at the bearing member installation portions 43 and 44 of the frame member 41, respectively, it is easily possible to turnably support the turning shaft member 32 (the turning shaft portions 31*c* and 31*d*) and the valve main body 31 with respect to the frame member 41 (the member forming the inner wall surface 25 of the intake port 20) without backlash.

In the embodiment, the bearing member 33 and the bearing member installation portion (the portion having a shape corresponding to the shape of the exterior appearance of the bearing member 33) 43 of the frame member 41 are formed so as to be fittable into each other, while having shapes by which the installation of the bearing member 33 into the bearing member installation portion 43 is unlikely to be released. In addition, the bearing member 34 and the bearing member installation portion (the portion having a shape corresponding to the shape of the exterior appearance of the bearing member 34) 44 of the frame member 41 are formed so as to be fittable into each other, while having shapes by which the installation of the bearing member 34 into the bearing member installation portion 44 is unlikely to be released. Accordingly, since the installation (fitting) of the bearing member 33 to the bearing member installation portion 43 can be unlikely to be released, and the installation (fitting) of the bearing member 34 to the bearing member installation portion 44 is unlikely to be released, it is possible to prevent the bearing members 33 and 34 from easily falling out of the frame member 41.

In the embodiment, the bearing member 33 includes the boss portion 33*b* having the bearing hole 33*a* into which the turning shaft member 32 is fitted, and the protruding portion 33*c* that is connected to the boss portion 33*b*, has the width W smaller than the outer diameter D of the boss portion 33*b*, and extends from the boss portion 33*b* in the Y2 direction orthogonal to the turning shaft member 32. The bearing member 34 includes the boss portion 34*b* having the bearing hole 34*a* into which the turning shaft member 32 is fitted, and the protruding portion 34*c* that is connected to the boss portion 34*b*, has the width W smaller than the outer diameter D of the boss portion 34*b*, and extends from the boss portion 34*b* in the Y2 direction orthogonal to the turning shaft member 32. In the state where the boss portion 33*b* and the protruding portion 33*c* of the bearing member 33 are fitted into the engagement hole 43*a* of the bearing member installation portion 43, and the boss portion 34*b* and the protruding portion 34*c* of the bearing member 34 are fitted into the engagement hole 44*a* of the bearing member installation portion 44, the bearing member 33 does not fall out of the bearing member installation portion 43 along the Y2 direction orthogonal to the turning shaft member 32, and the bearing member 34 does not fall out of the bearing member installation portion 44 along the Y2 direction orthogonal to the turning shaft member 32. Accordingly, due to the boss portion 33*b* and the protruding portion 33*c* of the bearing member 33, and the boss portion 34*b* and the protruding portion 34*c* of the bearing member 34, it is possible to prevent the bearing member 33 from falling out of the bearing member installation portion 43 along the Y2 direction, and it is possible to prevent the bearing member 34 from falling out of the bearing member installation portion 44 along the Y2 direction. Accordingly, it is possible to prevent the bearing members 33 and 34 from falling out of the frame member 41 along the Y2 direction.

In the embodiment, the outer surface 33*d* (the convex portion 33*f*) of the bearing member 33 and the inner surface 43*b* (the concave portion 43*c*) of the bearing member installation portion (the portion being fitted into the outer surface 33*d* (the convex portion 33*f*)) 43 are formed so as to be fittable into each other. The outer surface 34*d* (the convex portion 34*f*) of the bearing member 34 and the inner surface 44*b* (the concave portion 44*c*) of the bearing member installation portion (the portion being fitted into the outer surface 34*d* (the convex portion 34*f*)) 44 are formed so as to be fittable into each other. In the state where the bearing member 33 is fitted into the bearing member installation portion 43, and the bearing member 34 is fitted into the bearing member installation portion 44, the engagement between the convex portion 33*f* and the concave portion 43*c* is maintained, and the engagement between the convex portion 34*f* and the concave portion 44*c* is maintained. As a result, the bearing member 33 does not fall out of the bearing member installation portion 43 along the X1 direction in which the turning shaft member 32 extends, and the bearing member 34 does not fall out of the bearing member installation portion 44 along the X2 direction. Accordingly, due to the engagement between the outer surface 33*d* (the convex portion 33*f*) of the bearing member 33 and the inner surface 43*b* (the concave portion 43*c*) of the bearing member installation portion 43, and the engagement between the outer surface 34*d* (the convex portion 34*f*) of the bearing member 34 and the inner surface 44*b* (the concave portion 44*c*) of the bearing member installation portion 44, it is possible to prevent the bearing member 33 from falling out of the bearing member installation portion 43 along the X1 direction, and it is possible to prevent the bearing member 34 from falling out of the bearing member installation portion 44 along the X2 direction. Accordingly, it is possible to prevent the bearing members 33 and 34 from falling out of the frame member 41 along the X direction.

In the embodiment, the turning shaft member 32 includes the small-diameter portion 32c that has an outer diameter such that the small-diameter portion 32c can be inserted into the bearing members 33 and 34 which have a gap therebetween, and the large-diameter portion 32a (the portion positioned in the X1 direction) and the large-diameter portion 32b (the portion positioned in the X2 direction) which are respectively formed at the end portions (the portions positioned in the X1 direction and in the X2 direction, respectively) of the small-diameter portion 32c, in which the bearing members 33 and 34 can turnably support the turning shaft member 32, and, each of which has an outer diameter greater than that of the small-diameter portion 32c. In a state where the small-diameter portion 32c of each of the turning shaft members 32 (the members connecting the plurality of valve main bodies 31) is fitted into the bearing members 33 and 34, the turning shaft members 32 are formed integrally with the plurality of valve main bodies 31 via the large-diameter portions 32a and 32b. Accordingly, it is possible to easily fit the small-diameter portion 32c of the turning shaft member 32 into the bearing members 33 and 34, and in this state, it is possible to strongly connect (firmly fix) the opposite end portions of the turning shaft member 32 to the valve main bodies 31 via the large-diameter portions 32a and 32b having an outer diameter greater than that of the small-diameter portion 32c.

In the embodiment, the valve main body 31 made of resin includes the turning shaft portion 31c that is integrally provided at the first end 31a (the end positioned in the X1 direction) and the turning shaft portion 31d that is integrally provided at the second end 31b (the end positioned in the X2 direction). The large-diameter portion 32a of the turning shaft member 32 is connected to the turning shaft portion 31c, while having the same outer diameter as that of the turning shaft portion 31c. The large-diameter portion 32b of the turning shaft member 32 is connected to the turning shaft portion 31d, while having the same outer diameter as that of the turning shaft portion 31d. The bearing member 33 turnably supports the turning shaft portion 31c (the portion positioned in the X1 direction) of the valve main body 31, and the bearing member 34 turnably supports the turning shaft portion 31d (the portion positioned in the X2 direction) of the valve main body 31. Accordingly, it is possible to form the intake control valve 30 in such a manner that the turning shaft portions 31c and 31d of the valve main body 31 take a part of the functional roles of the turning shaft member 32. That is, the first end 31a of the valve main body 31 can be turnably supported directly by the turning shaft portion 31c having an outer diameter greater than that of the small-diameter portion 32c of the turning shaft member 32, and the second end 31b of the valve main body 31 can be turnably supported directly by the turning shaft portion 31d having an outer diameter greater than that of the small-diameter portion 32c. Accordingly, it is possible to stably support and turn the valve main body 31 interposed between the turning shaft portion 31c and the turning shaft portion 31d, while sufficiently ensuring a slide area between the turning shaft portion 31c and the bearing surface 33e of the bearing member 33, and a slide area between the turning shaft portion 31d and the bearing surface 34e of the bearing member 34. In addition, it is possible to not only prevent the bearing member 33 (34) from being subjected to wear, but also prevent the sliding outer surface of the turning shaft portion 31c (31d) made of resin from being subjected to wear.

The embodiment disclosed in this specification is an exemplary embodiment in all aspects, and this disclosure is not limited to this embodiment. The scope of this disclosure is defined by not only the description of the embodiment, but also the scope of the appended claims, and various modifications can be made to the embodiment disclosed here insofar as the modifications have the meaning equivalent to the scope of the appended claims and do not depart from the scope of the appended claims.

For example, in the embodiment, the shape of the exterior appearance of the bearing member 33 is formed so as to include the boss portion 33b having a partial circular arc-shaped exterior appearance; and the protruding portion 33c that extends from the boss portion 33b in the Y direction orthogonal to the pass-through direction of the bearing hole 33a. The bearing member installation portion 43 of the frame member 41 has the engagement hole 43a that is made by cutting the bearing member installation portion 43 into the shape of a keyhole so as to correspond to the shape of the exterior appearance of the bearing member 33. In addition, the bearing member 34 and the bearing member installation portion 44 are respectively formed into the same shapes as those of the bearing member 33 and the bearing member installation portion 43, for the fitting therebetween; however, this disclosure is not limited to this configuration. For example, the bearing member 33 (34) and the bearing member installation portion 43 (44) may have another fitting shape other than the above-mentioned shape.

Figure 10:
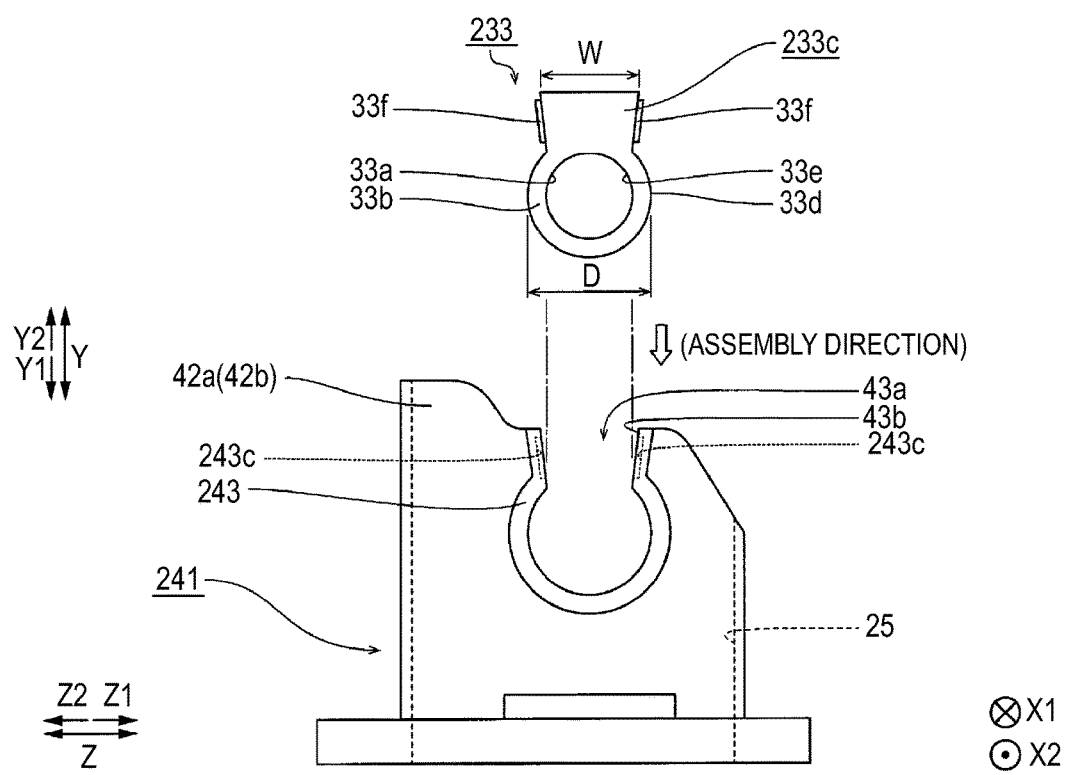
FIG. 10 is a view illustrating the fitting shape of a bearing member and a bearing member installation portion of a frame member, in the structure of an air flow control valve according to a modification example of this disclosure.

As an example, a bearing member 233 and a bearing member installation portion 243 of a frame member 241 may have a fitting shape as in a modification example illustrated in FIG. 10. That is, the shape of the exterior appearance of the bearing member 233 may be formed so as to include the boss portion 33b and a protruding portion 233c having an inverted trapezoidal shape. The bearing member installation portion 243 of the frame member 241 may have an engagement hole 243a that is made by cutting the bearing member installation portion 243 into the shape of a keyhole corresponding to the shape of the exterior appearance of the bearing member 233. The bearing member 233 is an example of the "first bearing member" and the "second bearing member" of the embodiment disclosed here. The bearing member installation portion 243 is an example of the "first bearing installation portion" and the "second bearing installation portion" of the embodiment disclosed here. The frame member 241 is an example of the "wall surface member" of the embodiment disclosed here. The protruding portion 233c is an example of the "second engaging portion" of the embodiment disclosed here. Also with the configuration of the modification example, since the installation (fitting) of the bearing member 233 to the bearing member installation portion 243 can be unlikely to be released in the Y2 direction, it is possible to prevent the bearing members 233 from easily falling out of the frame member 241.

In the embodiment, in a state where the valve main body 31 is provided with the turning shaft portion 31c (the portion positioned in the X1 direction) and the turning shaft portion 31d (the portion positioned in the X2 direction), the bearing members 33 and 34, into which the small-diameter portion 32c of the turning shaft member 32 is inserted, are moved, and finally, the turning shaft portion 31c is turnably supported by the bearing member 33 (the bearing surface 33e), and the turning shaft portion 31d is turnably supported by the bearing member 34 (the bearing surface 34*e*); however, this disclosure is not limited to this configuration. For example, the valve main body 31 and the turning shaft member 32 may be formed via insertion molding, in a state where the valve main body 31 is not provided with the turning shaft portions 31*c* and 31*d*, and the large-diameter portion 32*a* (the portion positioned in the X1 direction) and the large-diameter portion 32*b* (the portion positioned in the X2 direction) of the turning shaft member 32 are directly connected to the first end 31*a* and the second end 31*b* (each end having a curve shape) of the valve main body 31, respectively. In the structure of the air flow control valve of this disclosure, the large-diameter portion 32*a* of the turning shaft member 32 may be turnably supported by the bearing member 33 (the bearing surface 33*e*), and the large-diameter portion 32*b* of the turning shaft member 32 may be turnably supported by the bearing member 34 (the bearing surface 34*e*). Also with the configuration of the modification example, it is possible to stably support the valve main body 31 and the turning shaft member 32 while ensuring a sufficient slide area between the outer surface of the turning shaft member 32 (the large-diameter portions 32*a* and 32*b*) and the bearing surface 33*e* of the bearing hole 33*a* of the bearing member 33, and a sufficient slide area between the outer surface of the turning shaft member 32 (the large-diameter portions 32*a* and 32*b*) and the bearing surface 34*e* of the bearing hole 34*a* of the bearing member 34.

In the embodiment, in the structure of the air flow control valve of this disclosure, the turning shaft member 32 is made of metal (an aluminum alloy), and the bearing member 33 (34) is made of resin (polyamide); however, this disclosure is not limited to those materials. In the structure of the air flow control valve of this disclosure, the turning shaft member 32 may be made of metal, and the bearing member 33 (34) may be also made of metal. When the turning shaft member 32 made of resin is insertion-molded into the valve main body 31 made of metal, in the structure of the air flow control valve of this disclosure, the bearing member 33 (34) may be made of metal or resin. That is, in the bearing structure, each of the "connecting shaft" and the "bearing member" of this disclosure may be formed of a metal component, or one of the "connecting shaft" and the "bearing member" may be formed of a metal component, and the other may be formed of a resin component. When the "bearing member" is made of metal, the surface of the metal may be exposed on the bearing surface, or the bearing surface of the "bearing member" may be made by coating and sintering the mixture of resin and a material having good slidability (for example, fluorine-based resin (PTFE) or molybdenum) on the surface of the metal (the inner surface of the bearing surface). It is possible to reduce slide resistance and to more effectively absorb a tapping sound (a clack-clack sound) due to such a resin layer in addition to ensuring the appropriate clearance.

In the configuration of the assembly component 35 according to the embodiment, the three turning shaft members 32 connect the four valve main bodies 31; however, this disclosure is not limited to this configuration. The structure of the air flow control valve of this disclosure may be applied to another multiple air flow control valve other than the above-mentioned four-valve air flow control valve, insofar as the other multiple air flow control valve includes a plurality of valve main body portions.

In the embodiment, snap fitting is used for the engagement between the convex portion 33*f* (34*f*) and the concave portion 43*c* (44*c*), in which the convex portion 33*f* (34*f*) is provided on the outer surface 33*d* (34*d*) of the protruding portion 33*c* (34*c*) of the bearing member 33 (34), and the concave portion 43*c* (44*c*) is provided in the inner surface 43*b* (44*b*) of the bearing member installation portion 43 (44) at the position corresponding to the protruding portion 33*c* (34*c*); however, this disclosure is not limited to the snap fitting. That is, the convex portion may be provided on the outer surface 33*d* (34*d*) of the boss portion 33*b* (34*b*) of the bearing member 33 (34), and the concave portion may be provided in the inner surface 43*b* (34*b*) of the bearing member installation portion 43 (44) at the position corresponding to the boss portion 33*b* (34*b*). In addition, different from the engagement relationship in the above-mentioned embodiment, the bearing member 33 (34) may be provided with a concave portion, and the bearing member installation portion 43 (44) may be provided with a convex portion.

In the configuration of the intake device main body 90 according to the embodiment, the frame member 41 made of resin is assembled with the intake port 20 made of resin; however, this disclosure is not limited to this configuration. In the configuration of the intake device main body 90, the frame member 41 made of resin or metal may be assembled with the intake port 20 made of metal (for example, an aluminum alloy).

In the configuration of the intake device main body 90 according to the embodiment, the frame member 41 is assembled with the intake port 20; however, this disclosure is not limited to this configuration. For example, in the configuration of the intake device main body, the assembly component 35 (the intake control valve 30) may be directly assembled with the intake ports 20 without using the "wall surface member" of this disclosure.

In the configuration of the intake control valve 30 according to the embodiment, the four valve main bodies 31, each of which has a curved shape, are integrated into each other via the turning shaft members 32; however, this disclosure is not limited to this configuration. That is, the structure of the air flow control valve of this disclosure may be applied to the air flow control valve with a butterfly type of valve body main body portion including the turning shaft and blade portions that extend in the opposite direction along the radial direction of the turning shaft.

In the embodiment, the structure of the air flow control valve of this disclosure is applied to the variable intake control valve 30 such as a tumble control valve (TCV) for producing longitudinal vortexes in the cylinder head 203, and a swirl control valve (SCV) for producing transverse vortexes in the cylinder head 203; however, this disclosure is not limited to this configuration. For example, the structure of the air flow control valve of this disclosure may be applied to a variable intake control valve that is provided in a middle portion of the intake port and changes the length of the intake path.

In the embodiment, the intake control valve 30 and the intake device 100 with the structure of the air flow control valve of this disclosure are applied to the inline four cylinder engine 200 for a vehicle; however, this disclosure is not limited to this configuration. The intake control valve 30 and the intake device 100 with the structure of the air flow control valve of this disclosure may be applied to internal combustion engines (for example, gas engines (internal combustion engines such as a diesel engine and a gas engine) other than the gasoline engine) other than the engine 200 for a vehicle. Regardless of whether this disclosure is applied to the gasoline engine, the structure of the air flow control valve of this disclosure may be applied to the structure of an air flow control valve for a V-type multiple cylinder engine, a horizontal opposed cylinder engine, or the like other than the inline four cylinder engine 200. In addition, the structure of the air flow control valve of this disclosure may be applied to the structure of an air flow control valve for not only an internal combustion engine for a vehicle but also an internal combustion engine that is installed as a drive source (power source) of equipment.

A first aspect of this disclosure is directed to a structure of an air flow control valve including: a plurality of valve main body portions that are respectively provided in a plurality of intake ports, and control the flow of a fluid supplied to combustion chambers of an internal combustion engine; connecting shafts that are provided integrally with the plurality of valve main body portions, and connect the plurality of valve main body portions; a first bearing member that is formed of a single member having a first bearing hole which turnably supports the connecting shaft at a first end of the valve main body portion; and a second bearing member that is provided separately from the first bearing member, and is formed of a single member having a second bearing hole which turnably supports the connecting shaft at a second end of the valve main body portion. The connecting shafts are formed integrally with the plurality of valve main body portions in a state where the first bearing member and the second bearing member are respectively fitted onto the connecting shafts that connect the plurality of valve main body portions.

According to the first aspect of this disclosure, as described above, the structure of an air flow control valve includes the plurality of valve main body portions; the connecting shafts that are provided integrally with the plurality of valve main body portions; the first bearing member formed of a single member having the first bearing hole which turnably supports the connecting shaft at the first end of the valve main body portion; and the second bearing member formed of a single member having the second bearing hole which turnably supports the connecting shaft at the second end of the valve main body portion. The connecting shafts are formed integrally with the plurality of valve main body portions in a state where the first bearing member and the second bearing member are respectively fitted onto the connecting shafts that connect the plurality of valve main body portions. Accordingly, it is possible to turn a structural body (a structural body for an air flow control valve) (the structural body in which the valve main body portion and the connecting shaft are connected to each other and are integrated into each other) in the intake ports, while the first bearing member formed of a single member or the second bearing member formed of a single member is fitted into the connecting shaft, and an appropriate clearance therebetween is reliably ensured. That is, for example, when a bearing surface (an inner surface) of the connecting shaft is formed with bearing member pieces (the pieces being split into two components (members)) facing each other, it is necessary to set a clearance more than necessary between the connecting shaft and the bearing surface, while taking into consideration an assembly error (a relative positional offset between the bearing member pieces originating from the assembly of the bearing member pieces). In contrast, in this disclosure, since the first bearing member is formed of a single member in which the smooth bearing surface is pre-formed as the first bearing hole, and the second bearing member is formed of a single member in which the smooth bearing surface is pre-formed as the second bearing hole, it is possible to reliably maintain a clearance of a necessary minimum size (a given value) between the outer surface of the connecting shaft and the bearing surface of the first bearing hole of the first bearing member, and between the outer surface of the connecting shaft and the bearing surface of the second bearing hole of the second bearing member. Accordingly, during the operation of the air flow control valve, since the appropriate clearance between the connecting shaft and the bearing member is reliably ensured, it is possible to prevent the backlash of the connecting shaft with respect to the bearing member.

For example, when the two split bearing member pieces are used, and the connecting shaft turns in a state where an offset (step) is formed between the mating surfaces (the bearing surfaces) of the bearing member pieces facing each other, the connecting shafts are respectively brought into local contact (partial contact phenomenon) with the bearing surfaces due to the shape of the step between the mating surfaces, and the bearing surface is subjected to wear. In contrast, in this disclosure, since the first bearing member is formed of a single member in which the smooth bearing surface is pre-formed, and the second bearing member is formed of a single member in which the smooth bearing surface is pre-formed, it is possible to prevent at least the bearing surfaces from being subjected to wear originating from abnormal slide resistance. As a result, in the structure of the air flow control valve of this disclosure, the appropriate clearance is reliably ensured between the connecting shaft and the bearing member, and thereby it is possible to prevent the wear of the bearing member and to prevent the backlash of the connecting shaft. Since the backlash between the bearing member and the connecting shaft is prevented, it is possible to prevent the occurrence of an abnormal sound (a "clack-clack" tapping sound), and it is possible to smoothly turn the valve main body portion in the intake port.

In the structure of the air flow control valve according to the first aspect, it is preferable that the plurality of valve main body portions are made of resin, the connecting shafts are made of metal, and the connecting shafts made of metal are formed integrally with the plurality of valve main body portions via insertion molding when the plurality of valve main body portions are resin molded, in a state where the connecting shafts are respectively fitted into the first bearing member and the second bearing member. With this configuration, when the insertion-molded component (the structural body for an air flow control valve) (the component in which the valve main body portions made of resin and the connecting shafts made of metal are connected to each other) turns in the intake ports, it is possible to turnably support the entirety of the connecting shafts, while reliably ensuring the appropriate clearance between the outer surface of the connecting shaft and the bearing surface (the inner surface) of the first bearing hole of the first bearing member, and between the outer surface of the connecting shaft and the bearing surface (the inner surface) of the second bearing hole of the second bearing member. Accordingly, during the operation of the air flow control valve, it is possible to effectively reduce the slide resistance of each of the connecting shafts. To the extent that the slide resistance of each of the plurality of connecting shafts is reduced, it is possible to reduce the size of a drive source (an actuator) that turns the air flow control valve that includes the plurality of valve main body portions and the connecting shafts.

In the structure of the air flow control valve according to the first aspect, it is preferable that the structure of the air flow control valve further includes a wall surface member that has the first bearing member and the second bearing member installed at the first end and the second end thereof, respectively, the first bearing member and the second bearing member being fitted onto the connecting shafts formed integrally with the plurality of valve main body portions, and that forms a wall surface of the intake port. With this configuration, it is possible to install the first bearing member at the first end of the wall surface member while maintaining the appropriate clearance between the outer surface of the connecting shaft and the bearing surface (the inner surface) of the first bearing hole, and it is possible to install the second bearing member at the second end of the wall surface member while maintaining the appropriate clearance between the outer surface of the connecting shaft and the bearing surface (the inner surface) of the second bearing hole. Accordingly, it is possible to easily manufacture the structure of the air flow control valve for controlling the flow of a fluid in the plurality of intake ports, using the structural body (the assembly component) in which the connecting shafts are formed integrally with the plurality of valve main body portions, and which has the bearing structure appropriate for each of the connecting shafts.

In the structure of the air flow control valve according to the first aspect with the configuration that further includes the wall surface member, it is preferable that the connecting shafts are formed integrally with the plurality of valve main body portions in a state where the first bearing member and the second bearing member are respectively fitted onto the connecting shafts so as to be movable with respect to the connecting shafts in an axial direction, and the first bearing member and the second bearing member are moved in the axial direction of the connecting shaft in a state where the connecting shafts fitted into the first bearing member and the second bearing member are formed integrally with the plurality of valve main body portions, and thereby the first bearing member and the second bearing member are respectively installed at the first end and the second end of the wall surface member. With this configuration, when the first bearing member (the member, into the first bearing hole of which the connecting shaft is pre-fitted) and the second bearing member (the member, into the second bearing hole of which the connecting shaft is pre-fitted) are actually moved in the axial direction, it is possible to easily install the first bearing member at the first end of the wall surface member, and to easily install the second bearing member at the second end of the wall surface member. Accordingly, even when the structural body (the assembly component) (the structural body in which the valve main body portions and the connecting shafts are connected to each other and are integrated into each other) is used so as to control the air flow in the plurality of intake ports, it is possible to obtain the structure of the air flow control valve by easily assembling the assembly component into the wall surface members (the members forming the wall surfaces of the plurality of intake ports, respectively) in a state where the connecting shafts are formed integrally with the plurality of valve main body portions, and the bearing structure appropriate for each of the connecting shafts is obtained.

In the structure of the air flow control valve according to the first aspect with the configuration that further includes the wall surface member, it is preferable that the wall surface member is assembled with an intake device main body in a state where the first bearing member and the second bearing member fitted onto the connecting shaft are installed at the wall surface member. With this configuration, it is possible to easily assemble the assembly component (the component in which the valve main body portion is turnably assembled with the wall surface member using the first bearing member and the second bearing member, and which has the bearing structure appropriate for the connecting shaft) with the intake device main body via the wall surface members. That is, it is possible to easily obtain the structure of the air flow control valve by assembling the wall surface members into the intake device main body in a state where the appropriate clearance is maintained between the outer surface of the connecting shaft and the bearing surface (the inner surface) of the first bearing hole of the first bearing member, and between the outer surface of the connecting shaft and the bearing surface (the inner surface) of the second bearing hole of the second bearing member. As a result, it is possible to improve the efficiency of an operator who assembles the intake device in the manufacturing of the air flow control valve having a high quality bearing structure.

In the structure of the air flow control valve according to the first aspect with the configuration that further includes the wall surface member, it is preferable that the wall surface member includes a first bearing installation portion, at the first end of which the first bearing member is installed, and which has a shape corresponding to the shape of the exterior appearance of the first bearing member, and a second bearing installation portion, at the second end of which the second bearing member is installed, and which has a shape corresponding to the shape of the exterior appearance of the second bearing member. With this configuration, in a state where the bearing structure appropriate for each of the connecting shafts is obtained by installing the first and second bearing members at the first and second bearing installation portions of the wall surface member, respectively, it is easily possible to turnably support the connecting shaft and the valve main body portion with respect to the wall surface member (the member forming the wall surface of the intake port) without backlash.

In the structure of the air flow control valve according to the first aspect with the configuration in which the wall surface member includes the first bearing installation portion and the second bearing installation portion, it is preferable that the first bearing member and the first bearing installation portion of the wall surface member having a shape corresponding to the shape of the exterior appearance of the first bearing member are formed so as to have shapes by which the installation of the first bearing member into the first bearing installation portion is unlikely to be released and be fittable into each other, and the second bearing member and the second bearing installation portion of the wall surface member having a shape corresponding to the shape of the exterior appearance of the second bearing member are formed so as to have shapes by which the installation of the second bearing member into the second bearing installation portion is unlikely to be released and be fittable into each other. With this configuration, since the installation (fitting) of the first bearing member to the first bearing installation portion can be unlikely to be released, and the installation (fitting) of the second bearing member to the second bearing installation portion can be unlikely to be released, it is possible to prevent the first and second bearing members from easily falling out of the wall surface member.

In the structure of the air flow control valve according to the first aspect with the configuration in which the first bearing member and the first bearing installation portion are formed so as to be fittable into each other, and the second bearing member and the second bearing installation portion are formed so as to be fittable into each other, it is preferable that the first bearing member has a first engagement portion that has the first bearing hole into which the connecting shaft is fitted, and the second bearing member has the first engagement portion that has the second bearing hole into which the connecting shaft is fitted, and the first bearing member and the second bearing member have second engagement portions, respectively, which is connected to the first engagement portion, has a width smaller than that of the first engagement portion, and extends from the first engagement portion in a first direction orthogonal to the connecting shaft, and in the state where the first engagement portion and the second engagement portion of the first bearing member are fitted into the first bearing installation portion, and the first engagement portion and the second engagement portion of the second bearing member are fitted into the second bearing installation portion, the first bearing member does not fall out of the first bearing installation portion along the first direction, and the second bearing member does not fall out of the second bearing installation portion along the first direction. With this configuration, due to the first engagement portion and the second engagement portion of the first bearing member, and the first engagement portion and the second engagement portion of the second bearing member, it is possible to prevent the first bearing member from falling out of the first bearing installation portion along the first direction, and it is possible to prevent the second bearing member from falling out of the second bearing installation portion along the first direction. Accordingly, it is possible to prevent the first and second bearing members from falling out of the wall surface member along the first direction.

In the structure of the air flow control valve according to the first aspect with the configuration in which the first bearing member and the first bearing installation portion are formed so as to be fittable into each other, and the second bearing member and the second bearing installation portion are formed so as to be fittable into each other, it is preferable that an outer surface of the first bearing member can engage with an inner surface of the first bearing installation portion, into which the outer surface is fitted, and an outer surface of the second bearing member can engage with an inner surface of the second bearing installation portion, into which the outer surface is fitted, and the engagement between the respective outer surfaces and the inner surfaces is maintained in a state where the first bearing member is fitted into the first bearing installation portion, and the second bearing member is fitted into the second bearing installation portion, and thereby the first bearing member does not fall out of the first bearing installation portion along a second direction in which the connecting shaft extends, and the second bearing member does not fall out of the second bearing installation portion along the second direction. With this configuration, due to the engagement between the outer surface of the first bearing member and the inner surface of the first bearing installation portion, and the engagement between the outer surface of the second bearing member and the inner surface of the second bearing installation portion, it is possible to prevent the first bearing member from falling out of the first bearing installation portion along the second direction, and it is possible to prevent the second bearing member from falling out of the second bearing installation portion along the second direction. Accordingly, it is possible to prevent the first and second bearing members from falling out of the wall surface member along the second direction.

A second aspect of this disclosure is directed to an intake device including: a plurality of valve main body portions that are respectively provided in a plurality of intake ports of an intake device main body, and control the flow of a fluid supplied to combustion chambers of an internal combustion engine; connecting shafts that are provided integrally with the plurality of valve main body portions, and connect the plurality of valve main body portions; a first bearing member that has a first bearing hole which turnably supports the connecting shaft at a first end of the valve main body portion; and a second bearing member that is provided separately from the first bearing member, and has a second bearing hole which turnably supports the connecting shaft at a second end of the valve main body portion. The connecting shafts are formed integrally with the plurality of valve main body portions in a state where the first bearing member and the second bearing member are respectively fitted onto the connecting shaft between the plurality of valve main body portions.

According to the second aspect of this disclosure, as described above, the intake device includes the plurality of valve main body portions; the connecting shafts that are provided integrally with the plurality of valve main body portions; the first bearing member formed of a single member that has the first bearing hole which turnably supports the connecting shaft at the first end of the valve main body portion; and the second bearing member formed of a single member that has the second bearing hole which turnably supports the connecting shaft at the second end of the valve main body portion. The connecting shafts are formed integrally with the plurality of valve main body portions in a state where the first bearing member and the second bearing member are respectively fitted onto the connecting shafts that connect the plurality of valve main body portions. Accordingly, it is possible to turn a structural body (a structural body for an air flow control valve) (the structural body in which the valve main body portion and the connecting shaft are connected to each other and are integrated into each other) in the intake ports, while the first bearing member formed of a single member or the second bearing member formed of a single member is fitted into the connecting shaft, and an appropriate clearance therebetween is reliably ensured. That is, for example, when a bearing surface (an inner surface) is formed in the bearing portion in which bearing member pieces (the pieces being split into two components (members)) face each other with the connecting shaft interposed therebetween, it is necessary to set a clearance more than necessary between the connecting shaft and the bearing surface, while taking into consideration an assembly error (a relative positional offset between the bearing member pieces originating from the assembly of the bearing member pieces). In contrast, in this disclosure, since the first bearing member is formed of a single member in which the smooth bearing surface is pre-formed as the first bearing hole, and the second bearing member is formed of a single member in which the smooth bearing surface is pre-formed as the second bearing hole, it is possible to reliably maintain a clearance of a necessary minimum size (a given value) between the outer surface of the connecting shaft and the bearing surface of the first bearing hole of the first bearing member, and between the outer surface of the connecting shaft and the bearing surface of the second bearing hole of the second bearing member. Accordingly, during the operation of the air flow control valve, since the appropriate clearance between the connecting shaft and the bearing member is reliably ensured, it is possible to prevent the backlash of the connecting shaft with respect to the bearing member.

For example, when the two split bearing member pieces are used, and the connecting shaft turns in a state where an offset (step) is formed between the mating surfaces (the bearing surfaces) of the bearing member pieces facing each other, the connecting shafts are respectively brought into local contact (partial contact phenomenon) with the bearing surfaces due to the shape of the step between the mating surfaces, and the bearing surface is subjected to wear. In contrast, in this disclosure, since the first bearing member is formed of a single member in which the smooth bearing surface is pre-formed, and the second bearing member is formed of a single member in which the smooth bearing surface is pre-formed, it is possible to prevent the bearing surfaces from being subjected to wear originating from abnormal slide resistance. As a result, the intake device of this disclosure includes the structure of the air flow control valve in which the appropriate clearance is reliably ensured between the connecting shaft and the bearing member, and thereby it is possible to prevent the wear of the bearing member and to prevent the backlash of the connecting shaft. Since the backlash between the bearing member and the connecting shaft is prevented, it is possible to prevent the occurrence of an abnormal sound (a "clack-clack" tapping sound) in the intake device, and it is possible to smoothly turn the valve main body portion in the intake port.

In the intake device according to the second aspect, it is preferable that the intake device further includes a wall surface member that has the first bearing member and the second bearing member installed at the first end and the second end thereof, respectively, a first bearing member and a second bearing member being fitted onto the connecting shafts formed integrally with the plurality of valve main body portions, and that forms a wall surface of the intake port, and the wall surface member is assembled with the intake device main body in a state where the first bearing member and the second bearing member fitted onto the connecting shaft are installed at the wall surface member. With this configuration, it is possible to install the first bearing member at the first end of the wall surface member while maintaining the appropriate clearance between the outer surface of the connecting shaft and the bearing surface (the inner surface) of the first bearing hole, and it is possible to install the second bearing member at the second end of the wall surface member while maintaining the appropriate clearance between the outer surface of the connecting shaft and the bearing surface (the inner surface) of the second bearing hole. Accordingly, it is possible to easily manufacture the structure of the air flow control valve for controlling the flow of a fluid in the plurality of intake ports, using the structural body (the assembly component) in which the connecting shafts are formed integrally with the plurality of valve main body portions, and which has the bearing structure appropriate for each of the connecting shafts. With this configuration, it is possible to easily assemble the assembly component (the component in which the valve main body portion is turnably assembled with the wall surface member using the first bearing member and the second bearing member, and which has the bearing structure appropriate for the connecting shaft) with the intake device main body via the wall surface members. That is, it is possible to easily obtain the structure of the air flow control valve by assembling the wall surface members into the intake device main body in a state where the appropriate clearance is maintained between the outer surface of the connecting shaft and the bearing surface (the inner surface) of the first bearing hole of the first bearing member, and between the outer surface of the connecting shaft and the bearing surface (the inner surface) of the second bearing hole of the second bearing member. As a result, it is possible to improve the efficiency of an operator who assembles the intake device in the manufacturing of the intake device that has the structure of the air flow control valve having a high quality bearing structure.

In this disclosure, the structure of the air flow control valve according to the first aspect may have the following structure.

Supplementary Note

That is, in the structure of the air flow control valve according to the first aspect, the connecting shaft includes a first shaft portion that has an outer diameter such that the first shaft portion can be inserted into the first and second bearing members which have a gap therebetween, and a second shaft portion which is formed at an end portion of the first shaft portion, in which the first and second bearing members can turnably support the connecting shaft, and, each of which has an outer diameter greater than that of the first shaft portion. In a state where the first shaft portion of the connecting shaft (the shaft connecting the plurality of valve main body portions) is fitted into the first and second bearing members, the connecting shafts are formed integrally with the plurality of valve main body portions via the second shaft portions. With this configuration, it is possible to easily fit the first shaft portion of the connecting shaft into the first and second bearing members, and in this state, it is possible to strongly connect the end portions (the opposite end portions) of the connecting shaft to the valve main body portions via the second shaft portions, each of which has an outer diameter greater than that of the first shaft portion. In addition, the connecting shaft is supported by the first bearing member and the second bearing member via the second shaft portion having an outer diameter greater than that of the first shaft portion of the connecting shaft, and thereby it is possible to stably support the connecting shaft while ensuring a sufficient slide area between the outer surface of the connecting shaft (the second shaft portion) and the bearing surface of the first bearing hole of the first bearing member, and a sufficient slide area between the outer surface of the connecting shaft (the second shaft portion) and the bearing surface of the second bearing hole of the second bearing member.

According to this disclosure, as described above, it is possible to provide the structure of an air flow control valve and the intake device which can prevent the occurrence of wear of the bearing member and the backlash of the connecting shaft by reliably ensuring an appropriate clearance between the connecting shaft and the bearing member.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A structure of an air flow control valve comprising:
 a plurality of valve main body portions that are respectively provided in a plurality of intake ports, and control the flow of a fluid supplied to combustion chambers of an internal combustion engine;
 connecting shafts that are provided integrally with the plurality of valve main body portions, and connect the plurality of valve main body portions;
 a plurality of first bearing members, each of which is formed of a single member having a first bearing hole which turnably supports the connecting shaft at a first end of a respective valve main body portion; and a plurality of second bearing members, each of which is provided separately from the plurality of first bearing members, and each of which is formed of a single member having a second bearing hole which turnably supports the connecting shaft at a second end of a respective valve main body portion, wherein the connecting shafts are formed integrally with the plurality of valve main body portions in a state where the first bearing members and the second bearing members are respectively fitted onto the connecting shafts that connect the plurality of valve main body portions, and wherein at least one of said connecting shafts includes a first shaft portion that has an outer diameter such that the first shaft portion is inserted into respective first and second bearing members while having a gap between the first shaft portion and the respective first bearing member and a gap between the first shaft portion and the respective second bearing member, and a second shaft portion which is formed at each of opposing end portions of the first shaft portion, the second shaft portions in which the respective first and second bearing members turnably support the connecting shaft, respectively, and each of the second shaft portions having an outer diameter greater than that of the first shaft portion.

2. The structure of an air flow control valve according to claim 1, wherein the plurality of valve main body portions are made of resin, wherein the connecting shafts are made of metal, and wherein the connecting shafts made of metal are formed integrally with the plurality of valve main body portions via insertion molding when the plurality of valve main body portions are resin molded, in a state where the connecting shafts are respectively fitted into the first bearing members and the second bearing members.

3. The structure of an air flow control valve according to claim 1, further comprising:

wall surface members that have the first bearing members and the second bearing members installed at the first ends and the second ends thereof, respectively, the first bearing members and the second bearing members being fitted onto the connecting shafts formed integrally with the plurality of valve main body portions, and that form wall surfaces of the intake ports.

4. The structure of an air flow control valve according to claim 3, wherein the connecting shafts are formed integrally with the plurality of valve main body portions in a state where the first bearing members and the second bearing members are respectively fitted onto the connecting shafts so as to be movable with respect to the connecting shafts in an axial direction, and wherein the first bearing members and the second bearing members are moved in the axial direction of the connecting shafts in a state where the connecting shafts fitted into the first bearing members and the second bearing members are formed integrally with the plurality of valve main body portions, and thereby the first bearing members and the second bearing members are respectively installed at the first ends and the second ends of the wall surface members.

5. The structure of an air flow control valve according to claim 3, wherein the wall surface members are assembled with an intake device main body in a state where the first bearing members and the second bearing members fitted onto the connecting shafts are installed at the wall surface members.

6. The structure of an air flow control valve according to claim 3, wherein the wall surface members each include:

a first bearing installation portion, at the first end of which a respective first bearing member is installed, and which has a shape corresponding to the shape of the exterior appearance of the respective first bearing member, and a second bearing installation portion, at the second end of which a respective second bearing member is installed, and which has a shape corresponding to the shape of the exterior appearance of the respective second bearing member.

7. The structure of an air flow control valve according to claim 6, wherein, for each wall surface member, the respective first bearing member and the first bearing installation portion of the wall surface member having a shape corresponding to the shape of the exterior appearance of the respective first bearing member are formed so as to have shapes by which the installation of the respective first bearing member into the first bearing installation portion is unlikely to be released and be fittable into each other, and wherein, for each wall surface member, the respective second bearing member and the second bearing installation portion of the wall surface member having a shape corresponding to the shape of the exterior appearance of the respective second bearing member are formed so as to have shapes by which the installation of the respective second bearing member into the second bearing installation portion is unlikely to be released and be fittable into each other.

8. The structure of an air flow control valve according to claim 7, wherein, for each wall surface member, the respective first bearing member has a first engagement portion that has the first bearing hole into which the connecting shaft is fitted, and the respective second bearing member has the first engagement portion that has the second bearing hole into which the connecting shaft is fitted, and the respective first bearing member and the respective second bearing member have second engagement portions, respectively, which is connected to the first engagement portion, has a width smaller than that of the first engagement portion, and extends from the first engagement portion in a first direction orthogonal to the connecting shaft, and wherein, for each wall surface member, in the state where the first engagement portion and the second engagement portion of the respective first bearing member are fitted into the first bearing installation portion, and the first engagement portion and the second engagement portion of the respective second bearing member are fitted into the second bearing installation portion, the respective first bearing member does not fall out of the first bearing installation portion along the first direction, and the respective second bearing member does not fall out of the second bearing installation portion along the first direction.

9. The structure of an air flow control valve according to claim 7, wherein, for each wall surface member, an outer surface of the respective first bearing member can engage with an inner surface of the first bearing installation portion, into which the outer surface is fitted, and an outer surface of the respective second bearing member can engage with an inner surface of the second bearing installation portion, into which the outer surface is fitted, and wherein, for each wall surface member, the engagement between the respective outer surfaces and the inner surfaces is maintained in a state where the respective first bearing member is fitted into the first bearing installation portion, and the respective second bearing member is fitted into the second bearing installation portion, and thereby the respective first bearing member does not fall out of the first bearing installation portion along a second direction in which the connecting shaft extends, and the respective second bearing member does not fall out of the second bearing installation portion along the second direction.

10. The structure of an air flow control valve according to claim 1, wherein in a state where the first shaft portion of the at least one connecting shaft is fitted into the first and second bearing members, the connecting shafts are formed integrally with the plurality of valve main body portions via the second shaft portions.

11. An intake device comprising:

a plurality of valve main body portions that are respectively provided in a plurality of intake ports of an intake device main body, and control the flow of a fluid supplied to combustion chambers of an internal combustion engine;

connecting shafts that are provided integrally with the plurality of valve main body portions, and connect the plurality of valve main body portions;

a plurality of first bearing members, each of which has a first bearing hole which turnably supports the connecting shaft at a first end of a respective valve main body portion; and a plurality of second bearing members, each of which is provided separately from the plurality of first bearing members, and each of which has a second bearing hole which turnably supports the connecting shaft at a second end of a respective valve main body portion, wherein the connecting shafts are formed integrally with the plurality of valve main body portions in a state where the first bearing members and the second bearing members are respectively fitted onto the connecting shafts between the plurality of valve main body portions, and wherein at least one of said connecting shafts includes a first shaft portion that has an outer diameter such that the first shaft portion is inserted into respective first and second bearing members while having a gap between the first shaft portion and the respective first bearing member and a gap between the first shaft portion and the respective second bearing member, and a second shaft portion which is formed at each of opposing end portions of the first shaft portion, the second shaft portions in which the respective first and second bearing members turnably support the connection shaft, respectively, and each of the second shaft portions having an outer diameter greater than that of the first shaft portion.

12. The intake device according to claim 11, further comprising:

wall surface members that have the first bearing members and the second bearing members installed at the first ends and the second ends thereof, respectively, the first bearing members and the second bearing members being fitted onto the connecting shafts formed integrally with the plurality of valve main body portions, and that form wall surfaces of the intake ports, wherein the wall surface members are assembled with the intake device main body in a state where the first bearing members and the second bearing members fitted onto the connecting shafts are installed at the wall surface members.

* * * * *